United States Patent [19]
Shibayama

[11] Patent Number: 5,000,551
[45] Date of Patent: Mar. 19, 1991

[54] ZOOM LENS

[75] Inventor: Atsushi Shibayama, Kawasaki, Japan

[73] Assignee: Nikon Corporation, Tokyo, Japan

[21] Appl. No.: 532,792

[22] Filed: Jun. 4, 1990

[30] Foreign Application Priority Data

Jun. 5, 1989 [JP] Japan .................................. 1-142375
Aug. 18, 1989 [JP] Japan .................................. 1-212675

[51] Int. Cl.$^5$ ........................ G02B 15/14; G02B 13/18
[52] U.S. Cl. ..................................... 350/427; 350/432
[58] Field of Search ............................... 350/432–435, 350/423, 427

[56] References Cited

U.S. PATENT DOCUMENTS

| | | | |
|---|---|---|---|
| 4,523,814 | 6/1985 | Okudaira | 350/427 |
| 4,629,294 | 12/1986 | Tanaka et al. | 350/427 |
| 4,789,226 | 12/1988 | Ogata | 350/427 |
| 4,789,229 | 12/1988 | Yamanashi | 350/427 |
| 4,871,239 | 10/1989 | Masumoto et al. | 350/432 X |

Primary Examiner—Scott J. Sugarman
Attorney, Agent, or Firm—Shapiro and Shapiro

[57] ABSTRACT

A zoom lens comprises, in succession from the object side, a first lens group having a positive refractive power, a second lens group having a negative refractive power, a third lens group having a positive refractive power, and a fourth lens group having a positive refractive power, and is designed such that during the magnification change from the wide angle end to the telephoto end, the air space between the first lens group and the second lens group is enlarged, the air space between the second lens group and the third lens group is reduced and further, the air space between the third lens group and the fourth lens group is varied. The second lens group comprises, in succession from the object side, a negative meniscus lens having its convex surface facing the object side, a biconcave negative lens, and a cemented positive lens consisting of a biconvex positive lens and a biconcave negative lens cemented together, and is designed to satify the following conditions:

$$0.44 < |f_2/f_w| < 0.51$$

$$23 < \frac{(\nu_{21} + \nu_{22})}{2} - \nu_{231}$$

$$3 < \frac{(\nu_{232} - \nu_{231}) f_2}{r_{S1}} < 6.5.$$

28 Claims, 5 Drawing Sheets

ZOOM LENS

BACKGROUND OF THE INVENTION

1. Field of the Invention

This invention relates to a zoom lens for use in a single-lens reflex camera, an electronic still camera or the like, and in particular to a zoom lens of positive-negative-positive-positive four-group construction whose maximum angle of view includes a wide angle of view of 60° or greater and whose zoom ratio is of the order of three times.

2. Related Background Art

There are known numerous zoom lenses of positive-negative-positive-positive four-group construction coveing a maximum angle of view of 60° and having a zoom ratio of the order of three times, and one of such zoom lenses is proposed, for example, in the applicant's U.S. Pat. No. 4,699,475. Also, a zoom lens of such four-group construction in which a second lens group comprises, in succession from the object side, a negative lens, a negative lens and a cemented positive lens consisting of a positive lens and a negative lens is disclosed in Japanese Laid-Open Patent Application No, 58-202417.

In the embodiments of the former, i.e., U.S. Pat. No. 4,699,475, the number of lens components is as great as 15 to 16 and therefore, it is difficult for such a zoom lens to be inexpensively supplied as a zoom lens for common use in a single-lens reflex camera. Further, the total thickness of a second lens group is as great as 15.5 mm and therefore, to secure a zoom ratio amounting even to three times, the spacing between a first lens group and a third lens group must be secure sufficiently. As a result, the full length of the lenses the wide angle end amounts even to 130 mm and therefore, this zoom lens is bulky to carry a zoom lens for common use and can hardly be said to be preferable.

Also, in the latter, i.e., Japanese Laid-Open Patent Application No. 58-202417, the zoom ratio amounts even to 3.8 times and moreover, the total thickness of a second lens group is held down to the same degree as the former, and compactness to the full length is achieved for the zoom ratio. However, when zooming is effected from the wide angle end to the telephone end, chromatic aberration, particularly spherical aberration of g-line (435.8 nm), fluctuates greatly from over-corrected state to under-corrected state, and this leads to the problem that particularly when fully open aperture photographing is done by the use of black-and-white film, the image will be greatly deteriorated.

This is not limited in the lens disclosed in 1 Japanese Laid-Open Patent Application No. 58-202417, but any conventional zoom lens in which a second lens group comprises, in succession from the object side, a negative lens, a negative lens and a positive cemented lens consisting of a positive lens and a negative lens cemented together has suffered from the problem that the spherical aberration of g-line at the telephoto end is under-corrected.

Also known are numerous zoom lenses of positive-negative-positive-positive four-group construction including a maximum angle of view of 60° and having a zoom ratio of the order of three times in which a second lens group comprises, in succession from the object side, a negative lens, a cemented negative lens and a positive lens, and for example, Japanese Laid-Open Patent Application No. 57-192918 is known.

However, again in the zoom lens disclosed in this Japanese Laid-Open Patent Application No. 57-192918, the number of lens components is great and it is difficult for this zoom lens to be ineXpensively provided as a zoom lens for a single-lens reflex camera. Further, the full length of the lens at the wide angle is as great as 143 mm, which also poses a problem in portability.

SUMMARY OF THE INVENTION

The present invention has been made in order to eliminate all of the above-noted problems, and an object thereof is to provide a zoom lens of high performance which comprises a small number of lens components and is compact and excellent in portability and moreover has a high zoom ratio and yet in which various aberrations are corrected very well-balancedly and which has an excellent imaging performance.

According to the present invention, it becomes possible to provide a zoom lens in which, specifically, the number of lens components can be held down to about thirteen to thereby reduce the cost and the full length of the lens is held down to the order of 120 mm to thereby realize a construction advantageous in portability and various aberrations can be corrected well over the wide angle end to the telephoto end.

The zoom lens of the present invention has, in succession from the object side, a first lens group having a positive refractive power, a second lens group having a negative refractive power, a third lens group having a positive refractive power, and a fourth lens group having a positive refractive power, and is designed such that during the magnification change from the wide angle end to the telephoto end, the air space between the first lens group and the second lens group is enlarged, the air space between the second lens group and the third lens group is reduced and the air space between the third lens group and the fourth lens group is varied, the second lens group having, in succession from the object side, a negative meniscus lens having its convex surface facing the object side, a negative biconcave lens, and a positive cemented lens consisting of a biconvex lens and a biconcave lens cemented together, the second lens group being designed to satisfy the following conditions.

$$0.44 < |f_2/f_w| < 0.51$$

$$23 < \frac{(\nu_{21} + \nu_{22})}{2} - \nu_{231}$$

$$2 < \frac{(\nu_{232} - \nu_{231})f_2}{r_{s1}} < 6.5$$

where
- $f_w$ : the focal length of the zoom lens at the wise angle end
- $f_2$ : the focal length of the second lens group
- $\nu_{21}$: the Abbe number of the negative meniscus lens in the second lens group
- $\nu_{22}$: the Abbe number of the negative biconcave lens in the second lens group
- $\nu_{231}$: the Abbe number of the positive biconcave lens in the cemented positive lens in the second lens group $\nu_{232}$: the Abbe number of the negative biconcave lens in the cemented positive lens in the second lens group $r_{s1}$ the radius of curvature of the cemented surface of the cemented positive lens in the second lens group.

Also, where the second lens group comprises, in succession from the object side, a negative meniscus lens having its convex surface facing the object side, a cemented negative lens consisting of a positive lens and a negative lens cemented together, and a positive meniscus lens having its convex surface facing the object side, the second lens group is designed to satisfy the following conditions;

$$-0.6 < f2/fw < <0.4$$

$$-1.1 < f22/fw < -0.5$$

$$\nu 22n - \nu 22p > 19$$

where $f_w$: the focal length of the zoom lens at the wide angle end $f_2$: the focal length of the second lens group $f_{22}$: the focal length of the cemented negative lens in the second lens group $\nu_{22n}$: the Abbe number of the negative lens in the cemented negative lens in the second lens group $\nu_{22p}$: the Abbe number of the positive lens in the cemented negative lens in the second lens group.

Also, to achieve good aberration balance of the entire zoom lens, it is desirable that the following condition be further satisfied:

$$1 < f22/f21 < 1.6$$

where $f_{21}$: the focal length of the negative meniscus lens in the second lens group.

According to the present invention, there can be inexpensively achieved a compact zoom lens of short full length which covers a maximum angle of view of 60° and has a zoom ratio of the order of three times and yet has an excellent imaging performance by a very small number of lens components such as about thirteen lens components.

Thus, the zoom lens of the present invention is not only excellent in light weight and portability, but also a marked improvement in operability can be expected.

Further objects, features and effects of the present invention will become fully apparent from the following detailed description taken in conjunction with the accompanying drawings.

DESCRIPTION OF THE PREFERRED EMBODIMENTS

Figure 1:
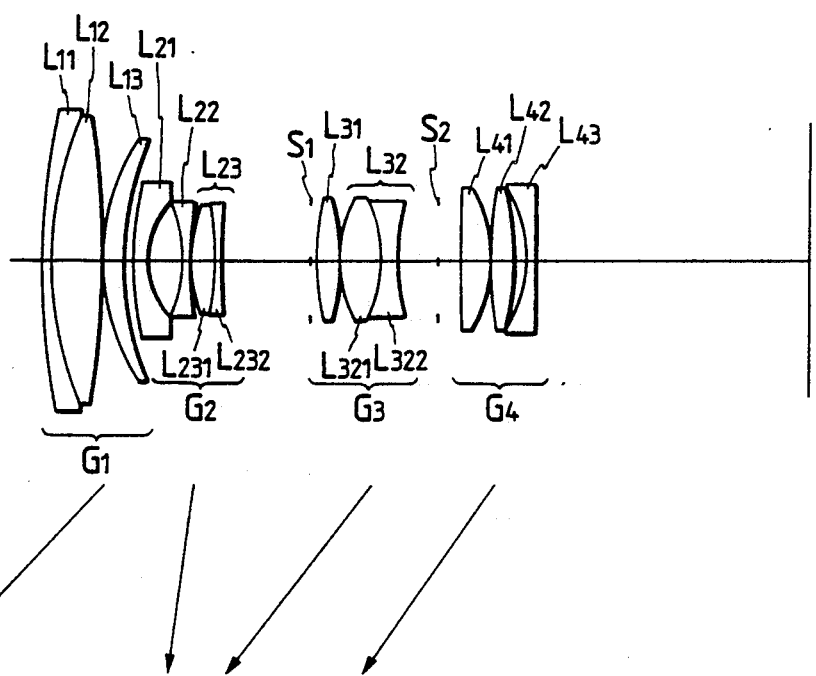
FIGS. 1 to 3 are optical system construction views showing zoom lenses according to first to third embodiments, respectively, of the present invention.

Some embodiments of the present invention will hereinafter be described in detail with reference to the accompanying drawings.

Each of first to fourth embodiments of the present invention shown in FIGS. 1 to 4 comprises, in succession from the object side, a first lens group G1 having a positive refractive power, a second lens group G2 having a negative refractive power, a third lens group G3 having a positive refractive power, and a fourth lens group G4 having a positive refractive power, said second lens group G2 having, in succession from the object side, a negative meniscus lens L21 having its convex surface facing the object side, a biconcave negative lens L22, and a cemented positive lens L23 consisting of a biconvex positive lens L231 and a biconcave negative lens L232 cemented together, and is designed such that during the magnification change from the wide angle end to the telephoto end, the air space between said first lens group G1 and said second lens group G2 is enlarged, the air space between said second lens group G2 and said third lens group G3 is reduced and the air space between said third lens group G3 and said fourth lens group G4 is varied and the following conditions are satisfied:

$$0.44 < |f_2/fw| < 0.51 \quad (1)$$

$$23 < \frac{(\nu_{21} + \nu_{22})}{2} - \nu_{231} \quad (2)$$

$$3 < \frac{(\nu_{232} - \nu_{231})f_2}{r_{s1}} < 6.5 \quad (3)$$

Where $f_w$: the focal length of the zoom lens at the wide angle end $f_2$: the focal length of the second lens group G2

$\nu_{21}$: the Abbe number of the negative meniscus lens L21 in the second lens group G2

$\nu_{22}$: the Abbe number of the biconcave negative lens L22 in the second lens group G2

$\nu_{231}$ the Abbe number of the biconvex positive lens L231 in the cemented positive lens L23 in the second lens group G2

$\nu 232$: the Abbe number of the biconcave negative lens L232 in the cemented positive lens L23 in the second lens group G2

$r_{s1}$: the radius of curvature of the cemented surface of the cemented positive lens L23.

Also, on the basis of the above-described construction, it is preferable to provide, in the second lens group G2, an aspherical surface in which negative refractive power progressing becomes stronger from the optic axis toward the margin. Specifically, it is advisable that the object side surface of the negative meniscus lens L21 in the second lens group G2 be constructed of an aspherical surface which satisfies the following condition:

$$X(l/2) - X_0(l/2) < X(l/4) - X_0(l/4) < 0 \quad (4)$$

where $$X(y) = X_0(y) + C_4 \cdot y^4 + C_6 \cdot y^6 + C_8 \cdot y^8 + C_{10} \cdot y^{10}$$

$$X_0(y) = \frac{y^2}{R(1 + \sqrt{1 - y^2/R^2})}$$

l : maximum image height
y : the height from the optic axis
X(y): the distance along the direction of the optic axis from the tangential plane at the vertex of the aspherical surface to the position on the aspherical surface at the height y
$X_o(y)$: the distance along the direction of the optic axis from the tangential plane at the vertex of the aspherical surface to the position on the paraxial reference spherical surface of the aspherical surface at the height y
R the radius of curvature of the paraxial reference spherical surface
$C_n$:aspherical surface coefficient (n=4,6,8,10).

Magnification change in the zoom lenses shown in FIGS. 1 to 4 is accomplished by varying chiefly the air space between the first lens group G1 and the second lens group G2 and the air space between the second lens group G2 and the third lens group G3.

To achieve a high zoom ratio on the basis of such construction, said two air spaces can be greatly varied.

However, if a great relative spacing is secure between the first lens group G1 and the third lens group G3 to secure a zoom ratio, the full length of the zoom lens will become great to thereby make it impossible to make the zoom lens compact.

So, to make both of the amount of variation in the air space between the first lens group G1 and the second lens group G2 and the amount of variations in the air space between the second lens group G2 and the third lens group G3 great, without making the relative spacing between the first lens group G1 and the third lens group G3, to thereby achieve a high zoom ratio, it is necessary to make the total lens thickness of the second lens group G2 as small as possible.

Accordingly, the second lens group G2 is made into a four-lens construction comprising, in succession from the object side, the negative meniscus lens L21 having its convex surface facing the object side, the biconcave negative lens L22, and the cemented positive lens L23 consisting of the biconvex positive lens L231 and the biconcave negative lens L232 cemented together, whereby the thinning of the second lens group G2 is achieved.

Also, to make the lens system compact and yet achieve a high zoom ratio and good aberration correction, it is necessary to prescribe the range of the focal length in the second lens group G2.

So, an adequate range of the focal length of the second lens group G2 is prescribed by the condition (1).

If the upper limit of the condition (1) is exceeded, the focal length of the second lens group G2 will become long and therefore, to achieve a high zoom ratio, it will be necessary that the spacing between the first lens group G1 and the third lens group G3 be made great. As a result, not only the full length of the lens will become great, but also the lens diameter of the first lens group G1 will become great, and this is not preferable. Conversely, if the lower limit of the condition (1) is exceeded, the focal length of the second lens group C2 will become short and therefore, correction of various aberrations such as spherical aberration, curvature of image field and coma will become very difficult and further, Petzval sum will become excessively negative and therefore, correction thereof will become difficult. To achieve sufficient aberration correction in the condition (1), it is more preferable that the lower limit value and upper limit value of the condition (1) be 0.45 and 0.475, respectively, and design be made so as to satisfy this range.

Now, as already described with respect to the prior art, in the conventional lens wherein the second lens group comprises, in succession from the object side, a negative lens, a negative lens and a cemented positive lens consisting of a positive lens and a negative lens cemented together, both the effect of achromatism between the lenses (so-called chromatic aberration correction) and the effect of achromatism obtained by the curvature of the cemented surface of the positive lens and negative lens constituting the cemented positive lens being made sharper have been made to work strongly. In this case, on the cemented surface of the cemented lens, of light rays parallel to the optic axis which enter the lens system, parallel light rays of higher image height have stronger effect of achromatism. Therefore, if in the second lens group, chromatic aberration of g-line for the light rays passing near the axis is corrected well, spherical aberration of g-line for light rays passing a location off the optic axis will arise very greatly in the negative direction. As a result, in the entire lens system, spherical aberration of g-line will become under-corrected and particularly, at the telephoto end, this tendency becomes remarkable.

So, in the first to fourth embodiments of the present invention, the effect of achromatism between the lenses (L21, L22, L23) constituting the second lens group G2 is made strong, while the effect of achromatic by the cemented surface of the positive lens L231 and the negative lens L232 constituting the cemented lens L23 is made relatively weak, whereby chromatic aberration, particularly spherical aberration of g-line is corrected well-balancedly.

So, in order to make strong the effect of achromatism between the lenses (L21, L22, L23) constituting the second lens group G2, specifically, the biconvex positive lens L231 in the cemented positive lens L23 in the second lens group G2 is designed so as to be of higher dispersion than the other lenses (L21, L22, L232) in this lens group, that is, such that Abbe number satisfies the relation that $\nu_{21}.\nu_{22}, \nu_{232} > \nu_{23}$, and the optimum relation in Abbe number between the lenses L21 and L22 relative to the biconvex positive lens 231 is prescribed in the condition (2).

The condition (2) is for making the effect of achromatis by the negative meniscus lens L21, the biconcav negative lens L22 and the biconvex lens L231 in the cemented positive lens L23 work strongly in the second lens group G2. If the range of condition (2) is departed from, the effect of achromatism of said lenses will become deficient and therefore, if an attempt is made to provide achromatism by the entire second lens group G2, the effect of achromatism of the cemented surface of the cemented lens L23 will have to be made strong and as previously described, the deterioration of spherical aberration of g-line will become remarkable and this is not preferable.

Also, in the condition (3), in order to make the effect of achromatism of the cemented surface of the cemented positive lens L23 relatively weak, the optimum radius of curvature of this cemented surface is prescribed, and this condition is for making good achromatism possible by the entire second lens group while correcting spherical aberration of g-line well-balancedly. If the upper limit of the condition (3) is exceeded, the effect of achromatism in the cemented surface of the cemented positive lens L23 will become excessively great and the correction of aspherical aberration of g-line will become difficult. Conversely, if the lower limit of this condition is exceeded, the effect of achromatism in the cemented surface of the cemented positive lens L23 will become insufficient and the achromatism in the entire second lens group G2 will become difficult. Also, if the achromatism of the second lens group G2 is unreasonably contrived, the Abbe numbers of the negative meniscus lens L21 and the biconcave negative lens L22 will have to be made remarkably great, and from limitations in the kinds of glass, a kind of glass having a low refractive index will have to be used for these two lenses L21 and L22. Therefore, Petzval sum will increase in the negative direction and it will become difficult to flatten the image plane and further, the correction of spherical aberration and coma will also become difficult. To correct spherical aberration of g-line well-balancedly, it is desirable that the upper limit value of the condition (3) be 6 and the second lens group be constructed within this range.

Now, the second lens group G2 in each of the zoom lenses according to the first to fourth embodiments of the present invention has a considerably strong refractive power as shown in the condition (1) to achieve the compactness and high zoom ratio of the lens system and moreover, comprises a small number of lenses and therefore, it becomes difficult to correct spherical aberration, coma and astigmatism at a time to an ideal aberration state. Particularly, if So, it is effective to provide an aspherical surface in the second lens group G2. Particularly. If the object side surface of the negative meniscus lens L21 sufficiently spaced apart from a stop S1 in the second lens group G2 is formed into an aspherical surface shape, the second lens group can be made to function effectively for off-axis light rays and therefore, it is also very effective for the correction of various aberrations including astigmatism as off-axis aberration. In this case, it is desirable to provide this aspherical surface so that the refractive power of the negative meniscus lens L21 may progressively become stronger from the optic axis toward the margin and satisfy the condition (4). Thereby, the correction of the curvature of the meridional image plane in the positive direction which is liable to become excessively great in the negative direction due to astigmatism chiefly on the wide angle side and the correction of spherical aberration which is liable to become under-corrected on the telephoto side can both be achieved well-balancedly.

Now, in order that more sufficient aberration correction may be performed in the zoom lens of the present invention, it is preferable that the first lens group G1 be constructed so as to have, in succession from the object side, a negative meniscus lens L11 having its convex surface facing the object side, a positive lens L12, and a positive meniscus lens L13 having its convex surface facing the object side. By so constructing the first lens group, spherical aberration and curvature of image field can be corrected well-balancedly. Alternatively, the negative meniscus lens L11 and the positive lens L12 may be cemented together, and in this case, there is an advantage in manufacture that it is difficult for the eccentricity in the first lens group G1 to occur.

It is also preferable that the third lens group G3 be constructed so as to have, in succession from the object side, a biconvex positive lens L31, and a cemented lens L32 comprising a biconvex positive lens L321 and a biconcave negative lens L322. This lens construction becomes very effective for the correction of spherical aberration and chromatic aberration. Further, to reliably realize good correction of spherical aberration, chromatic aberration and Petzval sum, it is desirable that the following conditions be satisfied:

$$0.27 < n322 - n321 \qquad (5)$$

$$-0.75 < rs2/f3 < -0.5 \qquad (6)$$

where $n_{321}$: the refractive index of the biconvex positive lens L321 in the cemented lens L32 in the third lens group G3 for d-line (587.6 nm)

$n_{322}$: the refractive index of the biconcave negative lens L322 in the cemente lens L32 in the third lens group G3 for d-Iine (587.6 nm)

$r_{s2}$: the radius of curvature of the cemented surface of the cemented lens L32 in the third lens group G3 f3: the focal length of the third lens group G3.

The condition (5) is concerned in the correction of spherical aberration and Petzval sum. If the range of this condition is departed from, not only the correction of spherical aberration will become difficult, but also Petzval sum will become excessively great in the negative direction, and this is not preferable.

The condition (6) is concerned in the correction of spherical aberration of g-line. In the present invention, the cemented surface of the cemented lens L32 in the third lens group G3 is of course made to act for the correction of spherical aberration and is also made to act advantageously for the correction of chromatic aberration, particularly spherical aberration of g-line. Specifically, the cemented surface of the cemented lens L32 is constructed so that the concave surface of sharp curvature may face the object side, whereby high-order aberration is created for light rays off the optic axis and the bending of spherical aberration of g-line in the negative direction created by the second lens group G2 is corrected well-balancedly. If the upper limit of the condition (6) is exceeded, the curvature of the cemented surface of the cemented lens L32 will become too strong and not only the creation of high-order spherical aberration will become serious and the correction thereof will become difficult, but also the correction of the other aberrations will become difficult. Conversely, if the lower limit of the condition (6) is exceeded, the curvature of the cemented surface of the cemented lens L32 will become weak and it will be impossible to obtain a sufficient correcting effect.

It is also preferable that the fourth lens group G4 be constructed so as to have, in succession from the object side, a positive lens L41, a biconvex positive lens L42 and a negative lens L43 having its surface of sharper curvature facing the object side. This construction will become advantageous for the correction of various aberrations including spherical aberration, and further become very advantageous for making the full length of the lens system short (compact).

If the construction as described above is adopted, the back focal length of the lens system can be shortened to such a degree that lens system will not contact, for example, with a quick return mirror provided on the camera body side of a single-lens reflex camera, and this can contribute to the compactness of the full length.

Further, to shorten the full length of the lens, it is desirable that the following condition be satisfied:

$$0.3 < D/f_w < 0.4 \quad (7)$$

where

D : the total on-axis thickness of the second lens group G2

$f_w$ : the focal length of the lens system at the wide angle end.

If the upper limit of the condition (7) is exceeded, the total on-axis thickness of the second lens group G2 will become too great, and to secure a sufficient zoom ratio, it will be necessary to make the spacing between the first lens group G1 and the third lens group G3 great, and this is contrary to the compactness of the full length of the lens system.

Conversely, if the lower limit of the condition (7) is exceeded, the thickness of each lens is the second lens group and the air space between the lenses will have to be made extremely small, and the degree of freedom in aberration correction will of course become null and the machining of lens parts will become difficult, and this is not preferable.

Figure 2:
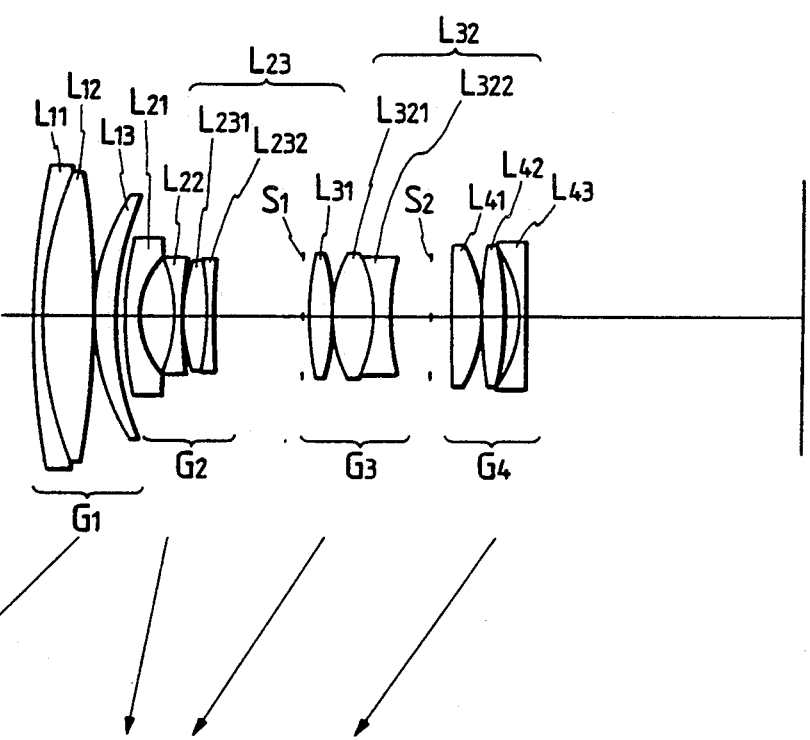
Figure 3:
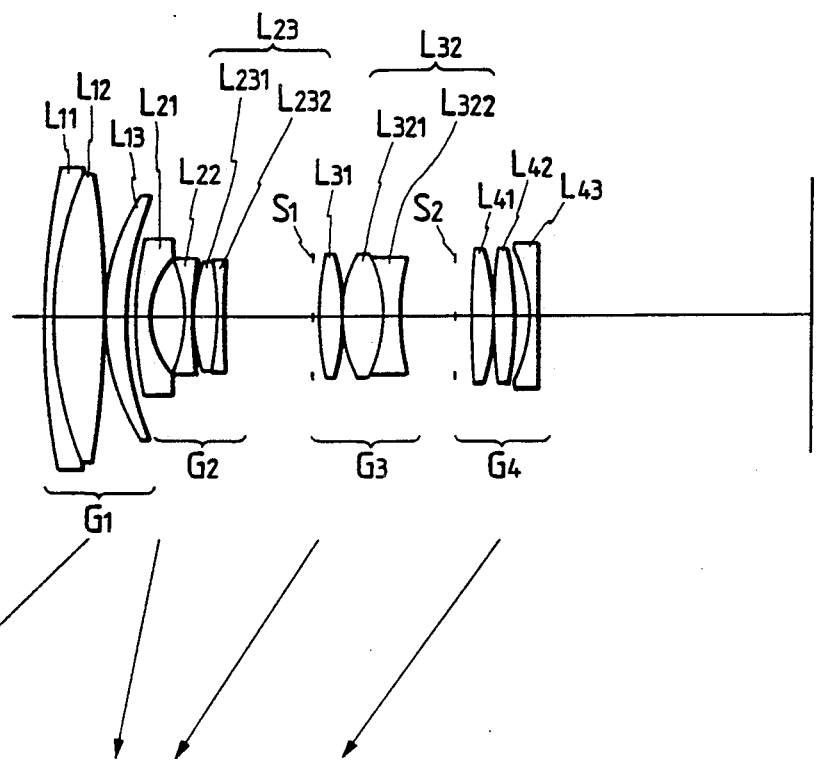

The zoom lens according to each of the first to fourth embodiments of the present invention has a focal length f of 36-103 and F-number of 3.6-4.6. FIGS. 1, 2 and 3 show the specific lens constructions of the first to third embodiments, respectively.

In the zoom lens according to each of the above-described embodiments, as shown, in succession from the object side, the first lens group G1 has a negative meniscus lens L11 having its convex surface facing the object side, a biconvex positive lens L12 cemented thereto, and a positive meniscus lens L13 having its convex surface facing the object side, the second lens group G2 has a negative meniscus lens L21 having its surface of sharper curvature facing the image side, a biconcave negative lens L22 having its surface of sharper curvature facing the object side, and a meniscus-shaped cemented positive lens L23 comprising a biconvex positive lens L231 and a biconcave negative lens L232 cemented together and having its surface of sharper curvature facing the object side as a whole, the third lens group G3 has a biconvex positive lens L31, and a meniscus-shaped cemented lens L32 comprising a biconvex positive lens L321 and a biconcave negative lens L322 cemented together and having its convex surface facing the object side as a whole, and the fourth lens group G4 has a positive lens L41 having its surface of sharper curvature facing the image side, and a negative lens L43 having its surface of sharper curvature facing the object side.

Figure 4:
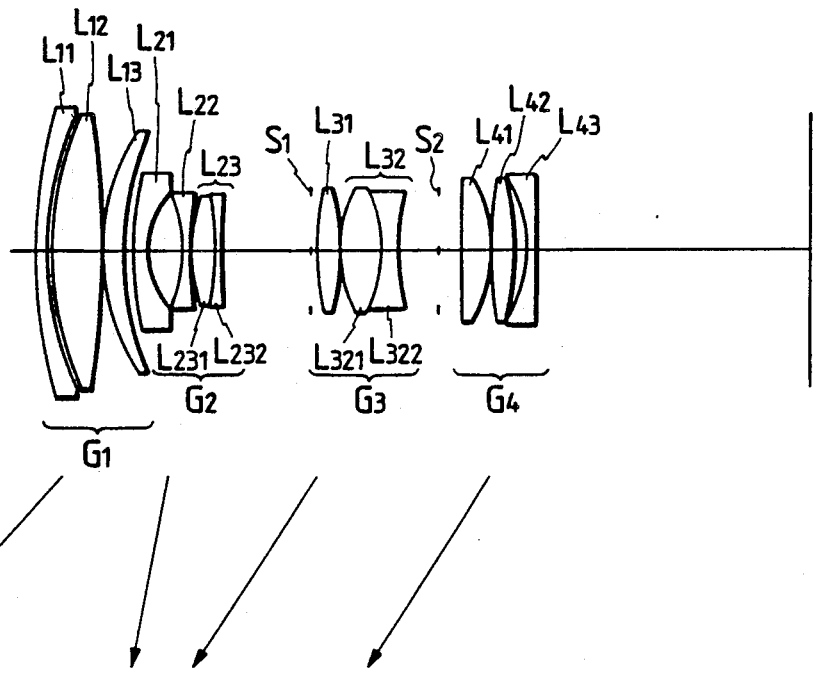
FIG. 4 is an optical system construction view showing a zoom lens according to a fourth embodiment of the present invention.

Also, in the zoom lens according to the fourth embodiment which, as shown in FIG. 4, has a lens construction substantially similar to that of each of the above-described embodiments, a negative meniscus lens L11 having its convex surface facing the object side in the first lens group G1 and a biconvex positive lens L12 are provided separately from each other.

In each of the above-described embodiments, as shown during the zooming from the wide angle end to the telephoto end, the first lens group G1 is rectilinearly moved toward the object side and the second to fourth lens group (G2-G4) are non-rectilinearly moved toward the object side so that the air space between the first lens group G1 and the second lens group G2 may be enlarged, the air space between the second lens group G2 and the third lens group G3 may be reduced and further, the air space between the third lens group G3 and the fourth lens group G4 may be varied.

Also, in each embodiment, the object side surface of the negative meniscus lens L21 located most adjacent to the object side of the second lens group is constructed of an aspherical surface, and in FIGS. 1, 2, 3 and 4, S1 designates an iris diaphragm and S2 denotes a flare stop for preventing flare.

Now, the numerical values of the first to fourth embodiments will be shown in Tables 1 to 4 below, respectively. In the Tables, the numbers at the left end represent the order from the object side, r represents the radius of curvature of each lens surface, d represents the thickness of each lens and the spacing between the lens surfaces, n represents the refractive index for d-line, and f represents the focal length of the zoom lens.

Also, in each table, the shape of the aspherical surface provided on the object side surface of the positive meniscus lens L21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and $C_n$ represents the aspherical surface coefficient with $10^{-n}$ as E-n.

TABLE 1

(First embodiment)
Focal length: f = 36-103
Angle of view: 2ω = 64.8°-22.8°
F-number: F NO = 3.6-4.6

| | r | d | ν | n |
|---|---|---|---|---|
| 1 | 116.278 | 1.50 | 23.0 | 1.86074 |
| 2 | 58.806 | 7.30 | 69.9 | 1.51860 |
| 3 | −124.613 | 0.10 | | |
| 4 | 33.356 | 3.80 | 55.6 | 1.69680 |
| 5 | 52.494 | (d5) | | |
| 6 | 75.327 | 1.50 | 55.6 | 1.69680 |
| 7 | 13.051 | 5.40 | | |
| 8 | −24.719 | 1.20 | 55.6 | 1.69680 |
| 9 | 109.615 | 0.20 | | |
| 10 | 29.741 | 3.30 | 25.5 | 1.80458 |
| 11 | −75.999 | 1.20 | 43.3 | 1.84042 |
| 12 | 158.365 | (d12) | | |
| 13 | 45.324 | 3.20 | 64.1 | 1.51680 |
| 14 | −38.885 | 0.10 | | |
| 15 | 21.606 | 6.20 | 69.9 | 1.51860 |
| 16 | −21.375 | 3.00 | 39.6 | 1.80454 |
| 17 | 54.807 | (d17) | | |
| 18 | 375.899 | 4.50 | 60.1 | 1.62041 |
| 19 | −23.234 | 0.10 | | |
| 20 | 74.386 | 3.30 | 50.8 | 1.65844 |
| 21 | −56.208 | 2.40 | | |
| 22 | −20.007 | 1.20 | 39.6 | 1.80454 |
| 23 | −829.763 | (Bf) | | |
| f | 35.9981 | 59.9964 | 103.0187 | |

TABLE 1-continued (First embodiment)
Focal length: f = 36–103
Angle of view: 2ω = 64.8°–22.8°
F-number: F NO = 3.6–4.6

| | | | |
|---|---|---|---|
| d5 | 1.5844 | 12.4303 | 23.1397 |
| d12 | 14.6271 | 8.5396 | 2.5286 |
| d17 | 9.1990 | 7.8301 | 7.4701 |
| Bf | 41.3233 | 51.1822 | 59.7216 |

Sixth surface (aspherical surface)
R = 75.327
$C_4 = -0.2279E-05$, $C_6 = -0.8209E-07$
$C_8 = 0.6910E-09$, $C_{10} = -0.2805E-11$

TABLE 2

(Second embodiment)
Focal length: f = 36–103
Angle of view: 2ω = 64.7°–22.8°
F-number: F NO = 3.6–4.6

| | r | d | ν | n |
|---|---|---|---|---|
| 1 | 118.343 | 1.50 | 23.0 | 1.86074 |
| 2 | 58.652 | 7.30 | 69.9 | 1.51860 |
| 3 | −122.366 | 0.10 | | |
| 4 | 33.396 | 3.80 | 55.6 | 1.69680 |
| 5 | 52.877 | (d5) | | |
| 6 | 73.858 | 1.50 | 53.3 | 1.69350 |
| 7 | 12.899 | 5.10 | | |
| 8 | −23.692 | 1.20 | 55.6 | 1.69680 |
| 9 | 120.425 | 0.20 | | |
| 10 | 29.938 | 3.30 | 25.5 | 1.80458 |
| 11 | −61.989 | 1.20 | 43.3 | 1.84042 |
| 12 | 189.256 | (d12) | | |
| 13 | 47.033 | 3.50 | 64.1 | 1.51680 |
| 14 | −38.870 | 0.10 | | |
| 15 | 20.876 | 6.20 | 56.4 | 1.50137 |
| 16 | −21.570 | 3.00 | 33.9 | 1.80384 |
| 17 | 59.932 | (d17) | | |
| 18 | 356.270 | 4.50 | 54.0 | 1.61720 |
| 19 | −22.902 | 0.10 | | |
| 20 | 78.513 | 3.30 | 58.5 | 1.65160 |
| 21 | −56.099 | 2.40 | | |
| 22 | −19.489 | 1.20 | 40.9 | 1.79631 |
| 23 | −387.670 | (Bf) | | |
| f | 36.0332 | 60.0354 | 103.0147 | |
| d5 | 1.7144 | 12.6172 | 23.3267 | |
| d12 | 14.4840 | 8.3965 | 2.3855 | |
| d17 | 9.1067 | 7.7378 | 7.3778 | |
| Bf | 41.4136 | 51.2588 | 59.7464 | |

Sixth surface (aspherical surface)
R = 73.858
$C_4 = -0.2036E-05$, $C_6 = -0.8148E-07$
$C_8 = 0.6559E-09$, $C_{10} = -0.2684E-11$

TABLE 3

(Third embodiment)
Focal length: f = 36–103
Angle of view: 2ω = 64.6°–22.8°
F-number: F NO = 3.6–4.6

| | r | d | ν | n |
|---|---|---|---|---|
| 1 | 120.145 | 1.50 | 25.5 | 1.80458 |
| 2 | 52.949 | 7.90 | 69.9 | 1.51860 |
| 3 | −110.566 | 0.10 | | |
| 4 | 31.984 | 3.80 | 55.6 | 1.69680 |
| 5 | 48.957 | (d5) | | |
| 6 | 49.087 | 1.80 | 46.5 | 1.80411 |
| 7 | 13.558 | 5.40 | | |
| 8 | −26.793 | 1.20 | 46.5 | 1.80411 |
| 9 | 114.932 | 0.20 | | |

TABLE 3-continued (Third embodiment)
Focal length: f = 36–103
Angle of view: 2ω = 64.6°–22.8°
F-number: F NO = 3.6–4.6

| | | | | |
|---|---|---|---|---|
| 10 | 30.047 | 3.30 | 23.0 | 1.86074 |
| 11 | −114.188 | 1.20 | 49.4 | 1.77279 |
| 12 | 110.881 | (d12) | | |
| 13 | 52.088 | 3.20 | 60.3 | 1.51835 |
| 14 | −42.661 | 0.10 | | |
| 15 | 19.984 | 6.20 | 64.1 | 1.51680 |
| 16 | −25.974 | 3.00 | 33.9 | 1.80384 |
| 17 | 49.762 | (d17) | | |
| 18 | 100.778 | 3.50 | 37.9 | 1.72342 |
| 19 | −31.102 | 0.10 | | |
| 20 | 146.905 | 3.00 | 33.9 | 1.80384 |
| 21 | −60.597 | 2.50 | | |
| 22 | −20.403 | 1.20 | 25.5 | 1.80458 |
| 23 | −3247.710 | (Bf) | | |
| f | 35.9988 | 59.9982 | 102.9942 | |
| d5 | 1.1646 | 11.9945 | 22.1327 | |
| d12 | 14.8379 | 8.6437 | 2.3302 | |
| d17 | 10.3479 | 9.6336 | 9.4800 | |
| Bf | 40.5897 | 49.8335 | 58.4844 | |

Sixth surface (aspherical surface)
R = 49.087
$C_4 = -0.6974E-05$, $C_6 = -0.4332E-07$
$C_8 = 0.2560E-09$, $C_{10} = -0.1310E-11$

TABLE 4

(Fourth embodiment)
Focal length: f = 36–103
Angle of view: 2ω = 64.7°–22.8°
F-number: F NO = 3.6–4.6

| | r | d | ν | n |
|---|---|---|---|---|
| 1 | 99.956 | 1.50 | 23.0 | 1.86074 |
| 2 | 54.213 | .50 | | |
| 3 | 53.257 | 7.30 | 69.9 | 1.51860 |
| 4 | −134.947 | 0.10 | | |
| 5 | 33.368 | 3.80 | 55.6 | 1.69680 |
| 6 | 50.215 | (d5) | | |
| 7 | 74.980 | 1.50 | 55.6 | 1.69680 |
| 8 | 12.950 | 5.10 | | |
| 9 | −24.122 | 1.20 | 55.6 | 1.69680 |
| 10 | 116.302 | 0.20 | | |
| 11 | 29.623 | 3.30 | 25.5 | 1.80458 |
| 12 | −79.429 | 1.20 | 43.3 | 1.84042 |
| 13 | 162.147 | (d12) | | |
| 14 | 42.225 | 3.50 | 64.1 | 1.51680 |
| 15 | −42.225 | 0.10 | | |
| 16 | 21.790 | 6.20 | 56.4 | 1.50137 |
| 17 | −21.790 | 3.00 | 33.9 | 1.80384 |
| 18 | 66.364 | (d18) | | |
| 19 | 1646.746 | 4.50 | 54.0 | 1.61720 |
| 20 | −23.205 | 0.10 | | |
| 21 | 61.237 | 3.30 | 58.5 | 1.65160 |
| 22 | −61.237 | 2.40 | | |
| 23 | −20.217 | 1.20 | 40.9 | 1.79631 |
| 24 | −1314.012 | (Bf) | | |
| f | 36.0362 | 60.1034 | 103.0141 | |
| d6 | 1.7713 | 12.6171 | 23.3266 | |
| d13 | 14.4840 | 8.3965 | 2.3855 | |
| d18 | 9.1067 | 7.7378 | 7.3778 | |
| Bf | 41.2895 | 51.0141 | 59.0757 | |

Seventh surface (aspherical surface)
R = 74.980
$C_4 = -0.1862E-05$, $C_6 = -0.8809E-07$
$C_8 = 0.7091E-09$, $C_{10} = -0.2741E-11$ Numerical values corresponding to conditions in the embodiments will be shown below.

NUMERICAL VALUES CORRESPONDING TO CONDITIONS

| Embodiment | $\left|\dfrac{f_2}{f_w}\right|$ | E | F | G | H | $n_{322} - n_{321}$ | $\dfrac{r_{s2}}{f_3}$ | $\dfrac{D}{f_w}$ |
|---|---|---|---|---|---|---|---|---|
| 1 | 0.467 | 30.1 | 3.946 | −0.094 | −0.004 | 0.28594 | −0.573 | 0.3556 |
| 2 | 0.467 | 31.1 | 4.840 | −0.093 | −0.003 | 0.30247 | −0.578 | 0.3469 |
| 3 | 0.469 | 23.5 | 3.913 | −0.145 | −0.007 | 0.28704 | −0.691 | 0.3639 |
| 4 | 0.464 | 30.1 | 3.791 | −0.093 | −0.003 | 0.30247 | −0.587 | 0.3469 |

In the above table, $$E = \frac{(\nu_{21} + \nu_{22})}{2} - \nu_{231}$$

$$F = \frac{(\nu_{232} - \nu_{231})f_2}{r_{s1}}$$

$$G = X(10.8) - X_0(10.8)$$

$$H = X(5.4) - X_0(5.4)$$

$$l/2 = 10.8,\ l/4 = 5.4$$

Fifth to ninth embodiments of the present invention shown in FIGS. 5 to 9 will now be described in detail.

These zoom lenses, as shoWn, differ in the construction of the second lens group G2 from the aforedescribed first to fourth embodiments. That is, the fifth to ninth embodiments of the present invention, as shown in FIGS. 5 to 9, are designed such that in a zoom lens having a first lens group G1 having a positive refractive power, a second lens group G2 having a negative refractive power, a third lens group G3 having a positive refractive power, and a fourth lens group G4 having a positive refractive power, said second lens group 2 comprises, in succession from the object side a negative meniscus a lens L21 having its convex surface facing the object side, a cemented negative lens L22 consisting of a positive lens L22p and a negative lens L22n cemented together, and a positive meniscus lens L23 having its convex surface facing the object side, that during the magnification change from the wide angle end to the telephoto end, the air space between said second lens group G2 and said third lens group G3 is reduced while the air space between said first lens group G1 and said second lens group G2 is enlarged and further, the air space between said third lens group G3 and said fourth lens group G4 is varied, and that the following conditions are satisfied:

$$-0.6 < f2/fw < -0.4 \qquad (8)$$

$$-1.1 < f22/fw < -0.5 \qquad (9)$$

$$\nu22 - \nu22 > 19 \qquad (10)$$

where
 $f_w$: the focal length of the zoom lens at the wide angle end
 $f_2$ : the focal length of the second lens group G2
 $f_{22}$: the focal length of the cemented negative lens L22 in the second lens group G2
 $\nu_{22p}$ : the Abbe number of the positive lens L22p the cemented negative lens L22 in the second lens group G2
 $\nu_{22n}$ : Abbe number of the negative lens L22n in the cemented negative lens L22 in the second lens group G2.

Figure 5:
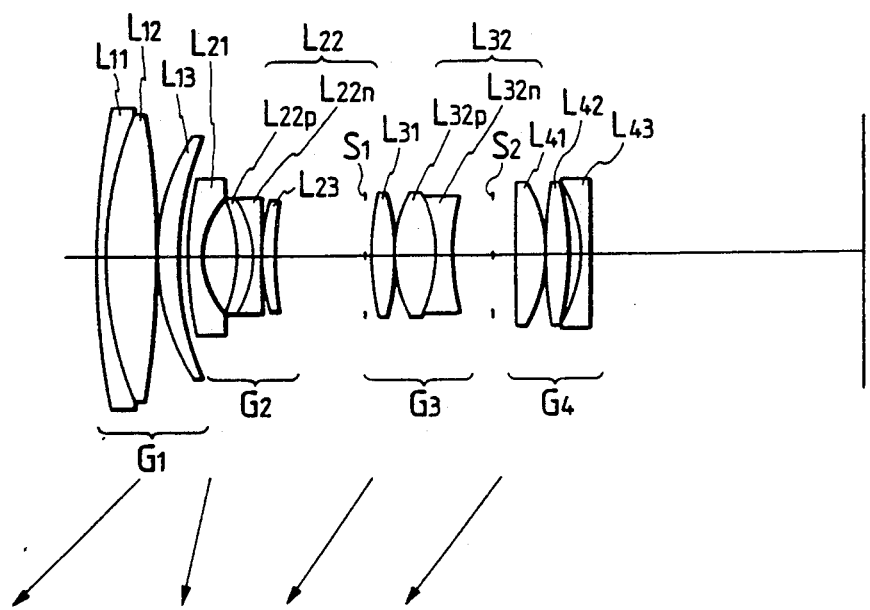
FIGS. 5 and 6 are optical system construction views showing zoom lenses according to fifth and sixth embodiments, respectively, of the present invention.
Figure 6:
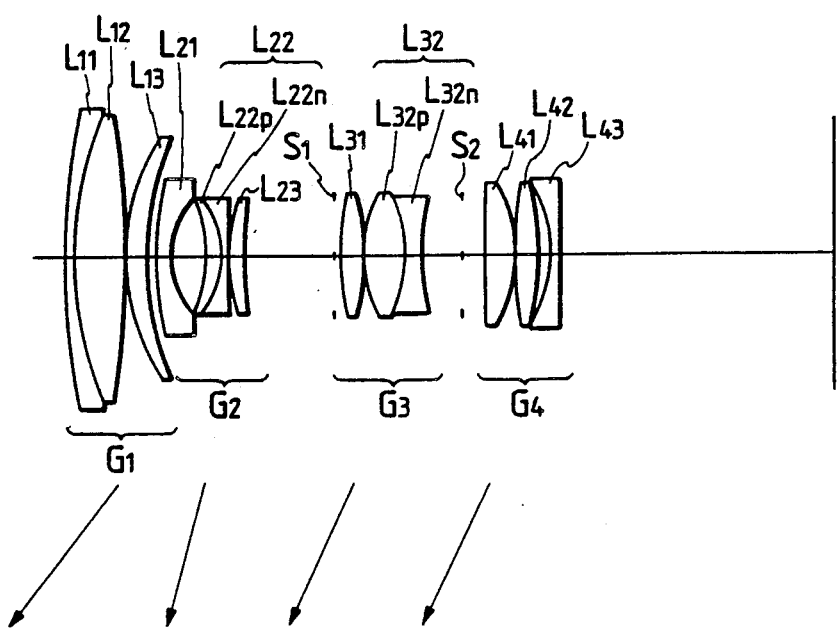
Figure 7:
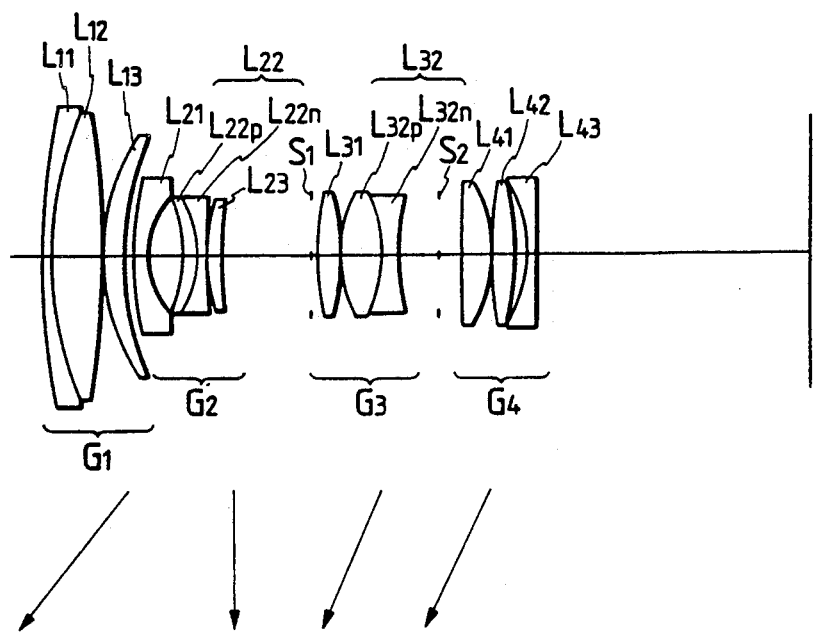
FIG. 7 is an optical system construction view showing a zoom lens according to a seventh embodiment of the present invention.

Also, it is desirable that as shown in FIGS. 5 to 7 the cemented negative lens L22 in the second lens group G2 be comprised, in succession from the object side, of a positive meniscus lens L22p having its convex surface facing the image side, and a negative lens L22n cemented thereto and having its surface of sharper curvature facing the object side, and in this case, it is more preferable that the following condition be satisfied:

$$-0.65 < rs1/fw < -0.3 \qquad (11)$$

where
 $f_{s1}$: the radius of curvature of the cemented surface of the cemented negative lens L22 in the second lens group G2.

Figure 8:
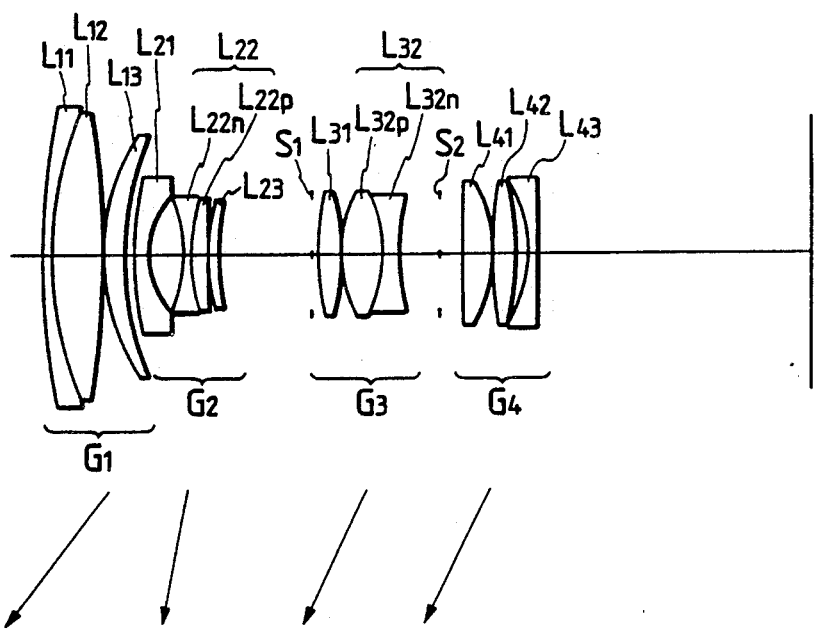
FIG. 8 is an optical system construction view showing a zoom lens according to an eighth embodiment of the present invention.
Figure 9:
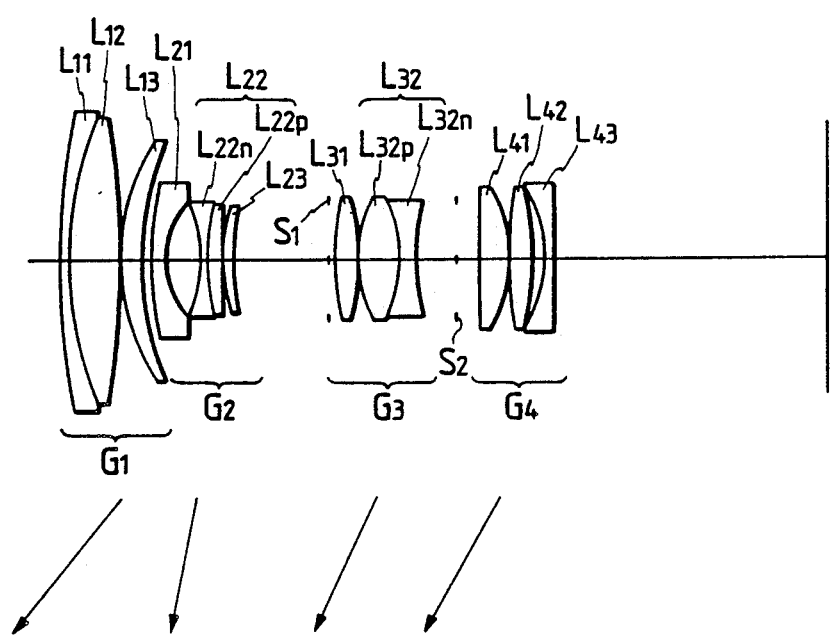
FIG. 9 is an optical system construction view showing a zoom lens according to a ninth embodiment of the present invention.

In contrast, as shown in FIGS. 8 and 9, the cemented negative lens L22 in the second lens group G2 may be comprised, in succession from the object side, of a biconcave negative lens L22n and a positive lens L22p cemented thereto and having its surface of sharper curvature facing the object side, and in this case, it is more desirable that the following condition be satisfied:

$$0.79 < rs1/fw < 2 \qquad (12)$$

where
 $r_{s1}$: the radius of curvature of the cemented surface of the cemented negative lens in the second lens group G2.

The magnification change in the zoom lenses of the present invention shown in FIGS. 5 to 9 is efficiently accomplished by varying chiefly the air space between the first lens group G1 and the second lens group G2 and the air space between the second lens group G2 and the third lens group G3.

To achieve a high zoom ratio while achieving the compactness of the full length of the lens on the basis of the above-described construction, it is necessary to make the total lens thickness of the second lens group G2 small by the use of a construction in which the refractive power of the second lens group G2 is strengthened.

In order to realize the above-described construction, in the present invention shown in FIGS. 5 to 9, the thinning of the second lens group G2 is realized by adopting as the second lens group G2 a construction comprising, in succession from the object side, a negative meniscus lens L21 having its convex surface facing the object side, a cemented negative lens L22 consisting of a positive lens L22p and a negative lens L22n cemented together, and a positive meniscus lens L23 having its convex surface facing the object side.

Further, the zoom lenses according to the fifth to ninth embodiments of the present invention are designed to satisfy the conditions (8) to (10) on the basis of the construction of the second lens group G2 described just above to achieve a high zoom ratio and yet make good balance of various aberrations and compactness compatible.

The condition (8) prescribes the optimum refractive power, i.e., the optimum focal length, of the second lens group G2. If the lower limit of the condition (8) is exceeded, the focal length of the second lens group G2 will become long and therefore, if a high zoom ratio is contrived, the amount of movement of the lens groups resulting from a magnification change will become great and the full length of the lens will become long, and this is contrary to compactness and is therefore not preferable. Conversely, if the upper limit of the condition (8) is exceeded, the focal length of the second lens group G2 will become short and the correction of spherical aberration, curvature of image field and coma will become very difficult. To achieve further compactness in the condition (8), it is desirable that the lower limit value be −0.5 and design be made so as to satisfy this range.

Now, if the second lens group G2 is constructed so as to satisfy the condition (8), the negative power of the second lens grou G2 will basically become strong, and generally this leads to the tendency of aberration correction becoming difficult. So, in the fifth to ninth embodiments of the present invention, a negative power is appropriately shared by the negative lens L21 and the cemented negative lens L22 which constitute the second lens group G2, whereby good aberration correction is realized. The optimum sharing of this negative power is typified by the optimum range of the focal length of the cemented negative lens L22 prescribed by the condition (9).

If the lower limit of the condition (9) is exceeded, the focal length of the cemented negative lens L22 in the second lens group G2 will become long and the power thereof will become weak, while the power of the negative lens L21 in the second lens group G2 will have to be strengthened. Thereupon, various aberrations such as curvature of image field and coma created by the negative lens L21 will become excessively great and the correction thereof will become difficult. Conversely, if the upper limit of the condition (9) is exceeded, the focal length of the cemented negative lens L22 will become short and the power thereof will become strong, and the radius of curvature of the object side surface of this cemented negative lens L22 will become small. Accordingly, the correction of various abberration such as curvature of image field and coma created in the object side surface of this cemented negative lens L22 will become difficult.

Now, the cemented negative lens L22 in the second lens group G2 functions to correct chromatic aberration. In order to make the chromatic aberration correcting function of this cemented negative lens L22 fully displayed, the condition (10) prescribes the optimum difference between the Abbe numbers of the positive lens L22p and the negative lens L22n which constitute the cemented negative lens L22.

If the range of this condition is departed from, the correction of chromatic aberration in the second lens group G2 will become insufficient and as a result, the fluctuation of on-axis chromatic aberration and chromatic difference of magnification by zooming will become excessively great.

Here, the lenses which constitute the cemented negative lens in the second lens group G2 can be negative and positive or positive and negative in succession from the object side, but to correct on-axis chromatic aberration and chromatic difference of magnification very well-balancedly, it is necessary to prescribe the optimum curvature of each cemented surface in each of these constructions.

So, the condition (11) prescribes the optimum radius of curvature of the cemented surface in a case where the cemented negative lens L22 in the second lens group G2, as shown in FIGS. 5–7, is comprised, in succession from the object side, of a positive lens $L22_p$ and a negative lens $L22_n$ cemented thereto.

If the lower limit of the condition (11) is exceeded, the curvature of the cemented surface of the cemented negative lens L22 in the second lens group G2 will become weak and the correction of on-axis chromatic aberration and chromatic difference of magnification in the second lens group G2 will become insufficient, and the balance between these two chromatic aberration will be greatly destroyed. Conversely, if the upper limit of the condition (11) is exceeded, the curvature of the cemented surface of the cemented negative lens L22 in the second lens group G2 will become too strong and high-order bending will occur to chromatic difference of magnification, and this is not preferable.

Also, the condition (12) prescribes the optimum radius of curvature of the cemented surface in a case where the cemented negative lens L22 in the second lens group G2, as shown in FIGS. 8 and 9, is comprised, in succession from the object side, of a negative lens $L22_n$ and a positive lens $L22_p$ cemented thereto.

If the upper limit of the condition (12) is exceeded, the curvature of the cemented surface of the cemented negative lens L22 in the second lens group G2 will become weak and the correction of on-axis romantic aberration and chromatic difference of magnification in the second lens group C2 will become insufficient, and the balance between these two chromatic aberrations will be greatly destroyed. Conversely, if the lower limit of the condition (12) is exceeded, the curvature of the cemented surface of the cemented negative lens L22 in the second lens group G2 will become too strong and high-order bending will occur to spherical aberration and particularly, high-order bending will occur to spherical aberration of g-line (435.8 nm). Therefore, in the entire zoom lens, spherical aberration of g-line will present an under-corrected state, and this is not preferable.

Further, in the fifth to ninth embodiments of the present invention, to achieve the compactness of the full length of the lens and a high zoom ratio and yet reliably achieve good aberration correction, it is desirable that the following conditions be satisfied:

$$-3 < f3/f2 < -2 \tag{13}$$

$$-4.2 < f4/f2 < -2.9 \tag{14}$$

where
$f_2$ : the focal length of the second lens group G2
$f_3$ : the focal length of the third lens group G3
$f_4$ : the focal length of the fourth lens group G4.

The condition (13) prescribes the optimum focal length of the third lens group G3. If the lower limit of the condition (13) is exceeded, it will be advantageous to the correction of various aberrations, but it will become difficult to make the full length of the lens compact. Conversely, if the upper limit of the condition (13) is exceeded, it will become difficult to correct various aberrations by a small number of lens components, and this is not preferable.

The condition (14) prescribes the optimum focal length of the fourth lens group G4. If the upper limit and the lower limit of the condition (14) are exceeded, it will become difficult to reduce the fluctuations of various aberrations caused by zooming, and this is not preferable.

Also, to achieve good aberration balance of the entire zoom lens, it is desirable that the following condition be satisfied:

$$1 < f_{22}/f_{21} < 1.6 \qquad (15)$$

where
- $f_{21}$: the focal length of the negative lens L21 in the second lens group
- $f_{22}$: the focal length of the cemented negative lens L22 in the second lens group.

The condition (15) prescribes the optimum power distribution in the negative lens L21 and the cemented negative lens L22 in the second lens group G2. The refractive power distribution in these two lenses is very important to the correction of curvature of image field and coma as described in connection with the condition (9), and the condition (15) is for balancing these aberrations well.

If the upper limit of the condition (15) is exceeded, the negative refractive power shared by the negative lens L21 in the second lens group G2 will become excessively great and therefore the aberration balance between curvature of image field and coma will be greatly destroyed and the correction thereof will become difficult. Conversely, i the lower limit of the condition (15) is exceeded, the negative refractive power shared by the cemented negative lens L22 in the second lens group G2 will become excessively great and therefore, the balance between curvature of image field and coma will be greatly destroyed and the correction thereof will become difficult.

Further, to improve the degree of freedom in aberration correction and yet correct various aberrations very well-balancedly, it is effective to provide an aspherical surface in the second lens group G2. If in this case, an iris diaphragm (aperture stop) S1 is disposed between the second lens group G2 and the third lens grouped G3 and the object side surface of the negative meniscus lens L21 or the cemented negative lens L22 in the second lens group G2 located most adjacent to the object side, which object side surface is relatively spaced apart from the iris diaphragm S1, is formed into an aspherical shape, it will become possible to effectively correct off-axis aberrations caused by off-axis light rays, particularly, astigmatism and coma.

Specifically, it is advisable to construct the negative meniscus lens L21 or the cemented negative lens L22 so that the negative refractive power thereof may progressively become stronger from the optic axis toward the margin. In this case, it is more preferable that the aspherical shape satisfy the following condition:

$$X(l/3) - X_0(l/3) < 0 \qquad (16)$$

where $$X(y) = X_0(y) + C_4 y^4 + C_6 y^6 + C_8 y^8 + C_{10} y^{10}$$

$$X_0(y) = \frac{y^2}{R(1 + \sqrt{1 - y^2/R^2})}$$

l: maximum image height
y : the height from the optic axis
R : the radius of curvature of the paraxial reference spherical surface
$C_l$: aspherical surface coefficient (l=4, 6, 8, 10)

X(y): the distance along the direction of the optic axis form the tangential plane at the vertex of the aspherical surface to the position on the aspherical surface at the height y $X_o(y)$: the distance along the direction of the optic axis from the tangential plane at the vertex of the aspherical surface to the position n the paraxial reference spherical surface of the aspherical surface at the height y.

If the aspherical surface is constructed so as to satisfy this condition (16), chiefly the correction in the positive direction of the curvature of the meridional image plane which is liable to become excessively great in the negative direction due to astigmatisms created at the wide angle side and the correction of spherical aberration which is liable to be under-corrected at the telephoto side can both be achieved well-balancedly.

In order that in the zoom lenses of the present invention shown in FIGS. 5-9, more sufficient aberration correction may be performed, it is preferable that as in the first to fourth embodiments, the first lens group G1 be constructed so as to have, in succession from the object side, a negative meniscus lens L11 having its convex surface facing the object side, a positive lens L12 and a positive meniscus lens L13 having its convex surface facing the object side. Thereby, spherical aberration and curvature of image field can be corrected well-balancedly. Alternatively, the negative meniscus lens L11 and the positive lens L12 may be cemented together, and in this case, there is obtained an advantage in manufacture that it is difficult for eccentricity in the first lens group to occur.

It is also preferable that the third lens group G3, as in the first to fourth embodiments, be constructed so as to have, in succession from the object side, a biconvex positive lens L31, and a cemented lens L32 consisting of a biconvex positive lens L32p and a biconcave negative lens L32n cemented together. This lens construction becomes very advantageous to the correction of spherical aberration and chromatic aberration. Further, to reliably realize good correction of spherical aberration, chromatic aberration and Petzval sum, it is desirable that the following conditions be satisfied:

$$0.26 < n_{32n} - n_{32p} \qquad (17)$$

$$-1.1 < r_s2/f_3 < -0.46 \qquad (18)$$

where
- $n_{32\,p}$ : the refractive index of the biconvex positive lens L32p in the cemented lens L32 in the third lens group for d-line (587.6nm)
- $n_{32n}$ : the refractive index of the biconcave negative lens L32n in the cemented lens L32 in the third lens group for d-line (587.6 nm)
- $r_s2$ : the radius of curvature of the cemented surface of the cemented lens L32 in the third lens group
- $f_3$ : the focal length of the third lens group G3.

The condition (17) is concerned in the correction of spherical aberration and Petzval sum. If the range of this condition is departed from, not only the correction of spherical aberration will become difficult, but also Petzval sum will become excessively great in the negative direction, and this is not preferable.

The condition (18) is concerned in the correction of spherical aberration and chromatic aberration. In the present invention, the cemented surface of the cemented lens L32 in the third lens group G3 is made to act to correct spherical aberration as well as to effectively act to correct chromatic aberration.

If the upper limit of the condition (18) is exceeded, the curvature of the cemented surface of the cemented lens L32 will become too strong and not only high-order spherical aberration will occur very greatly and the correction thereof will become difficult, but also the correction of the other aberrations will become difficult. Conversely, if the lower limit of the condition (18) is exceeded, the curvature of the cemented surface of the cemented lens L32 will become weak and it will become difficult to correct chromatic aberration and spherical aberration sufficiently.

It is also preferable that the fourth lens group G4 be constructed so as to have, in succession from the object side, a positive lens L41, a biconvex positive lens L42 and a negative lens L43 having its surface of sharper curvature facing the object side. This construction becomes advantageous to the correction of various aberration including spherical aberration and further, becomes very advantageous for making the full length of the lens system short (compact).

If the construction as described above is adopted, the back focal length of the lens system can be made short to such a degree that the lens system does not contact, for example, with a quick return mirror provided on the camera body side of a single-lens reflex camera, and this can contribute to the compactness of the full length.

Each of the zoom lenses according to the fifth to ninth embodiments of the present invention has a focal length f of 36–103 and F-number of about 3.5–4.6. FIGS. 5, 6 and 7 show the lens constructions of the fifth to seventh embodiments, respectively.

The zoom lens according to each of the above-described embodiments, as shown, is designed such that, in succession from the object side, the first lens group G1 comprises a negative meniscus lens L11 having its convex surface facing the object side, a biconvex positive lens L12 cemented thereto, and a positive meniscus lens L13 having its convex surface facing the object side, the second lens group G2 comprises a negative meniscus lens L21 having its convex surface facing the object side, a cemented negative lens L22 consisting of a positive meniscus lens L22p having its convex surface facing the image side and a negative lens L22n cemented thereto and having its surface of sharper curvature facing the object side, and a positive meniscus lens L23 having its convex surface facing the object side, the third lens group G3 comprises a biconvex positive lens L31 and a meniscus-shaped cemented lens L32 consisting of a biconvex positive lens L32p and a biconcave negative lens L32n cemented together and having its convex surface facing the object side as a whole, and the fourth lens group G4 comprises e positive lens L41 having its surface of sharper curvature facing the image side, a biconvex positive lens L42 and a negative lens L43 having its surface of sharper curvature facing the object side.

The zoom lenses according to the eighth and ninth embodiments, as shown in FIGS. 8 and 9, respectively, have a lens construction substantially similar to that of the above-described embodiments, where as the second lens group G2 comprises a negative meniscus lens L21 having its convex surface facing the object side, a cemented negative lens L22 consisting of a biconcave negative lens L22n and a positive lens L22p cemented thereto and having its surface of sharper curvature facing the object side, and a positive meniscus lens L23 having its convex surface facing the object side.

In each of the fifth to ninth embodiments, as shown, during the zooming from the wide angle end to the telephoto end, the air space between the second lens group G2 and the third lens group G3 is reduced while the air space between the first lens group G1 and the second lens group G2 is enlarged, and further the air space between the third lens group G3 and the fourth lens group G4 is varied. At this time, the fifth, sixth, eighth, and ninth embodiments have a construction in which each lens group is moved toward the object side, and the seventh embodiment has a construction in which as shown in FIG. 7, the second lens group G2 remains fixed and the other lens groups are moved toward the object side.

Also, in the fifth, seventh, eighth and ninth embodiments, as in the first to fourth embodiments, an aspherical surface is provided on the object side surface of the negative meniscus lens L21 in the second lens group G2 which is located most adjacent to the object side, and in the sixth embodiment, an aspherical surface is provided on the object side surface of the cemented negative lens L22 in the second lens group.

In FIGS. 5–9, as in FIGS. 1–4, S1 designates an iris diaphragm (aperture stop) and S2 denotes a flare stop for preventing flare. This flare stop S2 is moved with the third lens group G3 during zooming, and effectively functions chiefly for the elimination of coma flare at the intermediate angle of view in the picture plane.

Now, the numerical values of the fifth to ninth embodiments will be shown in Tables 5 to 9 below. In the tables, the numbers at the left end represent the order from the object side, r represents the radius of curvature of each lens surface, d represents the thickness of each lens and the spacing between lens surfaces, values for d-line are shown as the Abbe numbers and the refractive index n, and f represents the focal length of the zoom lens.

Also, in each table, the aspherical shape provided in the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, and Cn represents the aspherical surface coefficient with $10^{-n}$ as E-n.

TABLE 5

| (Fifth embodiment) Focal length: f = 36.3–103.01 Angle of view: 2ω = 64.7°–22.8° F-number: F NO = 3.6–4.6 | | | |
|---|---|---|---|
| r | d | Abbe | n |
| 1 | 118.343 | 1.50 | 23.0 | 1.86074 |
| 2 | 58.652 | 7.30 | 69.9 | 1.51860 |
| 3 | −122.366 | 0.10 | | |
| 4 | 33.634 | 3.80 | 51.1 | 1.73350 |
| 5 | 51.679 | 1.55 | | |
| 6 | 51.492 | 1.50 | 52.3 | 1.74810 |
| 7 | 13.662 | 5.10 | | |
| 8 | −24.720 | 2.80 | 25.5 | 1.80458 |
| 9 | −14.348 | 1.20 | 49.4 | 1.77279 |
| 10 | 418.286 | 0.20 | | |

TABLE 5-continued (Fifth embodiment)
Focal length: f = 36.3–103.01
Angle of view: 2ω = 64.7°–22.8°
F-number: F NO = 3.6–4.6

| | | | | |
|---|---|---|---|---|
| 11 | 30.648 | 1.90 | 25.5 | 1.80458 |
| 12 | 64.282 | 14.33 | | |
| 13 | 48.210 | 3.50 | 64.1 | 1.51680 |
| 14 | −37.593 | 0.10 | | |
| 15 | 21.267 | 6.20 | 56.4 | 1.50137 |
| 16 | −21.285 | 3.00 | 33.9 | 1.80384 |
| 17 | 62.757 | 9.63 | | |
| 18 | 340.249 | 4.50 | 53.9 | 1.71300 |
| 19 | −23.909 | 0.10 | | |
| 20 | 91.716 | 3.30 | 58.5 | 1.65160 |
| 21 | −72.874 | 2.40 | | |
| 22 | −19.349 | 1.20 | 40.9 | 1.79631 |
| 23 | −285.532 | 41.20 | | |

| | | | |
|---|---|---|---|
| f | 36.0328 | 60.0348 | 103.0120 |
| d5 | 1.5511 | 12.3989 | 23.1064 |
| d12 | 14.3330 | 8.2455 | 2.2345 |
| d17 | 9.6254 | 8.2565 | 7.8965 |
| Bf | 41.2000 | 51.0445 | 59.5303 |

Sixth surface (aspherical surface)
$C_4 = -0.3616\text{E}-05$, $C_6 = -0.8343\text{E}-07$
$C_8 = 0.69071\text{E}-09$, $C_{10} = -0.2864\text{E}-11$

TABLE 6

(Sixth embodiment)
Focal length: f = 36.03–103.01
Angle of view: 2ω = 64.6°–22.8°
F-number: F NO = 3.6–4.6

| | r | d | Abbe | n |
|---|---|---|---|---|
| 1 | 118.343 | 1.50 | 23.0 | 1.86074 |
| 2 | 58.652 | 7.30 | 69.9 | 1.51860 |
| 3 | −122.366 | 0.10 | | |
| 4 | 33.396 | 3.80 | 55.6 | 1.69680 |
| 5 | 52.877 | 1.79 | | |
| 6 | 85.328 | 1.50 | 57.5 | 1.67025 |
| 7 | 13.626 | 5.10 | | |
| 8 | −24.265 | 2.40 | 25.5 | 1.80458 |
| 9 | −13.985 | 1.20 | 47.5 | 1.78797 |
| 10 | −1196.567 | 0.20 | | |
| 11 | 31.517 | 2.30 | 25.5 | 1.80458 |
| 12 | 70.772 | 14.26 | | |
| 13 | 47.033 | 3.50 | 64.1 | 1.51680 |
| 14 | −38.870 | 0.10 | | |
| 15 | 20.876 | 6.20 | 56.4 | 1.50137 |
| 16 | −21.570 | 3.00 | 33.9 | 1.80384 |
| 17 | 59.933 | 9.11 | | |
| 18 | 356.270 | 4.50 | 54.0 | 1.61720 |
| 19 | −22.902 | 0.10 | | |
| 20 | 78.513 | 3.30 | 58.5 | 1.65160 |
| 21 | −56.099 | 2.40 | | |
| 22 | −19.489 | 1.20 | 40.9 | 1.79631 |
| 23 | −387.656 | 41.41 | | |

| | | | |
|---|---|---|---|
| f | 36.0329 | 60.0347 | 103.0125 |
| d5 | 1.7902 | 12.6360 | 23.3455 |
| d12 | 14.2575 | 8.1700 | 2.1590 |
| d17 | 9.1067 | 7.7378 | 7.3778 |
| Bf | 41.4128 | 51.2574 | 59.7436 |

Eighth surface (aspherical surface)
$C_4 = -0.3808\text{E}-05$, $C_6 = -0.1145\text{E}-06$
$C_8 = 0.1538\text{E}-08$, $C_{10} = -0.1336\text{E}-10$

TABLE 7

(Seventh embodiment)
Focal length: f = 36.03–103.00
Angle of view: 2ω = 64.9°–22.5°
F-number: F NO = 3.6–4.3

| | r | d | Abbe | n |
|---|---|---|---|---|
| 1 | 118.343 | 1.50 | 23.0 | 1.86074 |
| 2 | 58.652 | 7.30 | 69.9 | 1.51860 |
| 3 | −122.366 | 0.10 | | |
| 4 | 33.396 | 3.80 | 55.6 | 1.69680 |

TABLE 7-continued (Seventh embodiment)
Focal length: f = 36.03–103.00
Angle of view: 2ω = 64.9°–22.5°
F-number: F NO = 3.6–4.3

| | | | | |
|---|---|---|---|---|
| 5 | 52.877 | 1.82 | | |
| 6 | 61.938 | 1.50 | 55.6 | 1.69680 |
| 7 | 13.009 | 5.10 | | |
| 8 | −24.778 | 2.40 | 25.5 | 1.80458 |
| 9 | −16.249 | 1.20 | 52.3 | 1.74810 |
| 10 | 172.526 | 0.20 | | |
| 11 | 29.980 | 2.30 | 25.5 | 1.80458 |
| 12 | 80.762 | 14.47 | | |
| 13 | 42.555 | 3.50 | 64.1 | 1.51680 |
| 14 | −38.088 | 0.10 | | |
| 15 | 21.789 | 6.20 | 56.4 | 1.50137 |
| 16 | −21.658 | 3.00 | 33.9 | 1.80384 |
| 17 | 56.880 | 8.80 | | |
| 18 | 293.077 | 4.50 | 54.0 | 1.61720 |
| 19 | −22.932 | 0.10 | | |
| 20 | 80.751 | 3.30 | 58.5 | 1.65160 |
| 21 | −61.128 | 2.40 | | |
| 22 | −19.591 | 1.20 | 40.9 | 1.79631 |
| 23 | −274.524 | 41.49 | | |

| | | | |
|---|---|---|---|
| f | 36.0329 | 59.9997 | 102.9999 |
| d5 | 1.8185 | 14.9331 | 25.9585 |
| d12 | 14.4699 | 8.8867 | 2.4707 |
| d17 | 8.7976 | 7.5612 | 8.2439 |
| Bf | 41.4869 | 48.3064 | 54.0396 |

Sixth surface (aspherical surface)
$C_4 = -0.4308\text{E}-05$, $C_6 = -0.9156\text{E}-07$
$C_8 = 0.7541\text{E}-09$, $C_{10} = -0.3154\text{E}-11$

TABLE 8

(Eighth embodiment)
Focal length: f = 36.03–103.01
Angle of view: 2ω = 64.7°–22.8°
F-number: F NO = 3.6–4.6

| | r | d | Abbe | n |
|---|---|---|---|---|
| 1 | 113.125 | 1.50 | 23.0 | 1.86074 |
| 2 | 57.134 | 7.30 | 69.9 | 1.51860 |
| 3 | −126.031 | 0.10 | | |
| 4 | 33.040 | 3.80 | 58.5 | 1.65160 |
| 5 | 54.293 | 1.33 | | |
| 6 | 52.180 | 1.50 | 57.5 | 1.67025 |
| 7 | 12.713 | 5.10 | | |
| 8 | −24.918 | 1.10 | 52.3 | 1.74810 |
| 9 | 32.898 | 2.30 | 23.0 | 1.86074 |
| 10 | 167.263 | 0.10 | | |
| 11 | 27.406 | 1.90 | 25.5 | 1.80458 |
| 12 | 52.450 | 15.02 | | |
| 13 | 51.155 | 3.50 | 69.9 | 1.51860 |
| 14 | −38.045 | 0.10 | | |
| 15 | 20.881 | 6.20 | 56.4 | 1.50137 |
| 16 | −21.302 | 3.00 | 33.9 | 1.80384 |
| 17 | 64.699 | 8.89 | | |
| 18 | −7924.511 | 4.50 | 50.8 | 1.65844 |
| 19 | −23.176 | 0.10 | | |
| 20 | 78.513 | 3.30 | 57.0 | 1.62280 |
| 21 | −51.820 | 2.40 | | |
| 22 | −19.489 | 1.20 | 40.9 | 1.79631 |
| 23 | −325.859 | 41.74 | | |

| | | | |
|---|---|---|---|
| f | 36.0327 | 60.0344 | 103.0112 |
| d5 | 1.3272 | 12.1730 | 22.8825 |
| d12 | 15.0199 | 8.9324 | 2.9214 |
| d17 | 8.8935 | 7.5246 | 7.1646 |
| Bf | 41.7425 | 51.5867 | 60.0720 |

Sixth surface (aspherical surface)
$C_4 = -0.3724\text{E}-05$, $C_6 = -0.6826\text{E}-07$
$C_8 = 0.4312\text{E}-09$, $C_{10} = -0.1677\text{E}-11$

TABLE 9

(Ninth embodiment)
Focal length: f = 36.03–103.01
Angle of view: 2ω = 64.7°–22.8°
F-number: F NO = 3.5–4.5

| | r | d | Abbe | n |
|---|---|---|---|---|
| 1 | 117.146 | 1.50 | 23.0 | 1.86074 |
| 2 | 59.914 | 7.30 | 69.9 | 1.51860 |
| 3 | −129.995 | 0.10 | | |
| 4 | 34.324 | 3.80 | 58.5 | 1.65160 |
| 5 | 58.817 | 1.42 | | |
| 6 | 48.701 | 1.50 | 57.5 | 1.67025 |
| 7 | 12.637 | 5.10 | | |
| 8 | −24.441 | 1.10 | 52.3 | 1.74810 |
| 9 | 34.076 | 2.30 | 23.0 | 1.86074 |
| 10 | 155.098 | 0.10 | | |
| 11 | 27.849 | 1.90 | 25.5 | 1.80458 |
| 12 | 55.884 | 14.95 | | |
| 13 | 40.866 | 3.50 | 69.9 | 1.51860 |
| 14 | −42.729 | 0.10 | | |
| 15 | 22.791 | 6.20 | 56.4 | 1.50137 |
| 16 | −20.659 | 3.00 | 33.9 | 1.80384 |
| 17 | 76.686 | 8.81 | | |
| 18 | −10952.961 | 4.50 | 50.8 | 1.65844 |
| 19 | −23.332 | 0.10 | | |
| 20 | 79.500 | 3.30 | 57.0 | 1.62280 |
| 21 | −51.786 | 2.40 | | |
| 22 | −19.555 | 1.20 | 40.9 | 1.79631 |
| 23 | −297.866 | 41.82 | | |

| f | 36.0325 | 60.0339 | 103.0097 |
|---|---|---|---|
| d5 | 1.4211 | 12.2669 | 22.9764 |
| d12 | 14.9469 | 8.8594 | 2.8484 |
| d17 | 8.8131 | 7.4442 | 7.0842 |
| Bf | 41.8181 | 51.6619 | 60.1462 |

Sixth surface (aspherical surface)
$C_4 = -0.3743E-05$, $C_6 = -0.6955E-07$
$C_8 = 0.5633E-09$, $C_{10} = -0.2637E-11$ Values corresponding to conditions in the fifth to ninth embodiments of the present invention will be shown below.

NUMERICAL VALUES CORRESPONDING TO CONDITIONS

| Embodiments | $\frac{f_2}{f_w}$ | $\frac{f_{22}}{f_w}$ | E | $\frac{r_{s1}}{f_w}$ | $\frac{f_3}{f_2}$ | $\frac{f_4}{f_2}$ | $\frac{f_{22}}{f_{21}}$ | F | G | $\frac{r_{s2}}{f_3}$ |
|---|---|---|---|---|---|---|---|---|---|---|
| 5 | −0.466 | −0.862 | 23.9 | −0.398 | −2.221 | −3.672 | 1.228 | −0.017 | 0.3025 | −0.570 |
| 6 | −0.466 | −0.889 | 22.0 | −0.388 | −2.221 | −3.672 | 1.313 | −0.020 | 0.3025 | −0.578 |
| 7 | −0.466 | −0.830 | 26.8 | −0.451 | −2.221 | −3.672 | 1.249 | −0.020 | 0.3025 | −0.580 |
| 8 | −0.466 | −0.869 | 29.3 | 0.913 | −2.221 | −3.672 | 1.229 | −0.017 | 0.3025 | −0.571 |
| 9 | −0.466 | −0.839 | 29.3 | 0.946 | −2.221 | −3.672 | 1.168 | −0.017 | 0.3025 | −0.554 |

In the above table,
$E = \nu_{22n} - \nu_{22p}$
$F = X(1/3) - X_o(1/3) = 21.6$
$G = n_{32n} - n_{32p}$ Each of the fifth to ninth embodiments of the present invention, like the first to fourth embodiments, can inexpensively achieve a compact zoom lens of short full length covering a maximum angle of view of 60° and having a zoom ratio of the order of three times and yet having an excellent imaging performance by a very small number of lens components such as about thirteen.

Thus, not only the light weight of the lens and excellence in portability can be achieved, but also a marked improvement in operability can be expected.

I claim:

1. A zoom lens comprising, in succession from the object side, a first lens group having a positive refractive power, a second lens group having a negative power, a third lens group having a positive refractive power, and a fourth lens group having a positive refractive power, said zoom lens being designed such that during the magnification change from the wide angle end to the telephoto end, the air space between said first lens group and said second lens group is enlarged, the air space between said second lens group and said third lens group is reduced and further, the air space between said third lens group and said fourth lens group is varied, said second lens group comprising, in succession from the object side, a negative meniscus lens having its convex surface facing the object side, a biconcave negative lens, and a cemented positive lens consisting of a biconvex positive lens and a biconcave negative lens cemented together, said second lens group being designed to satisfy the following conditions:

$$0.44 < |f_2/f_w| < 0.51$$

$$23 < \frac{(\nu_{21} + \nu_{22})}{2} - \nu_{231}$$

$$3 < \frac{(\nu_{232} - \nu_{231})f_2}{r_{S1}} < 6.5$$

where $f_w$: the focal length of the zoom lens at the wide angle end
$f_2$: the focal length of the second lens group
$\nu_{21}$: the Abbe number of the negative meniscus lens in the second lens group
$\nu_{22}$: the Abbe number of the biconcave negative lens in the second lens group
$\nu_{231}$: the Abbe number of the biconvex positive lens in the cemented positive lens in second lens group
$\nu_{232}$: the Abbe number of the biconcave negative lens in the cemented positive lens in the second lens group
$r_{S1}$: the radius of curvature of the cemented surface of the cemented positive lens in the second lens group.

2. A zoom lens according to claim 1, wherein said second lens group is further designed to satisfy the following condition in order to correct various aberrations such as spherical aberration, curvature of image field and coma sufficiently:

$$0.45 < |f_2/f_w| < 0.475.$$

3. A zoom lens according to claim 1, wherein the radius of curvature $r_{S1}$ of said cemented positive lens in said second lens group is designed to satisfy the following condition in order to correct spherical aberration of g-line better balancedly:

$$3 < \frac{(\nu_{232} - \nu_{231})f_2}{r_{s1}} < 6.$$

4. A zoom lens according to claim 1, wherein one of the surfaces of the plurality of lenses constituting said second lens group is formed into an aspherical surface whose negative refractive power progressively becomes stronger from the optic axis toward the margin.

5. A zoom lens according to claim 4, wherein the object side surface of said negative meniscus lens in said second lens group which is located most adjacent to the object side is formed into an aspherical surface which satisfies the following condition:

$$X(l/2) - X_0(l/2) < X(l/4) - X_0(l/4) < 0$$

where $$X(y) = X_0(y) + C_4 \cdot y^4 + C_6 \cdot y^6 + C_8 \cdot y^8 + C_{10} \cdot y^{10}$$

$$X_0(y) = \frac{y^2}{R(1 + \sqrt{1 - y^2/R^2})}$$

l : maximum image height
y : the height from the optic axis
X(y) : the distance along the direction of the optic axis from the tangential plane at the vertex of the aspherical surface to the position on the aspherical surface at the height y
$X_0(y)$ the distance along the direction of the optic axis from the tangential plane at the vertex of the aspherical surface to the position on the paraxial reference spherical surface of the aspherical surface at the height y
R : the radius of curvature of the paraxial reference spherical surface
$C_n$ : aspherical surface coefficient (n=4, 6, 8, 10).

6. A zoom lens according to claim 1, wherein said second lens group is designed to satisfy the following condition:

0.3 < D/fw < 0.4 where D is the total on-axis thickness of said second lens group.

7. A zoom lens according to claim 1, wherein said third lens group comprises, in succession from the object side, a biconvex single lens having a positive refractive power, and a cemented lens consisting of a biconvex positive lens and a biconcave negative lens cemented together.

8. A zoom lens according to claim 7, wherein when the refractive indices of said biconvex positive lens and said biconcave negative lens in said cemented lens in said third lens group for d-line (587.6 nm) are $n_{321}$ and $n_{322}$, respectively and further, the focal length of said third lens group is $f_3$ and the radius of curvature of the cemented surface of said cemented lens is said third lens group is $r_{s2}$, said cemented lens in said third lens group is designed to satisfy the following conditions:

0.27 < $n_{322} - n_{321}$ $-0.75 < r_{s2}/f_3 < -0.5$.

9. A zoom lens according to claim 1, wherein said fourth lens group comprises, in succession from the object side, a positive lens, a biconvex positive lens and a negative lens having its surface of sharper curvature facing the object side.

10. A zoom lens according to claim 1, which is constructed in accordance with the following data:

| | r | d | ν | n |
|---|---|---|---|---|
| 1 | 116.278 | 1.50 | 23.0 | 1.86074 |
| 2 | 58.806 | 7.30 | 69.9 | 1.51860 |
| 3 | −124.613 | 0.10 | | |
| 4 | 33.356 | 3.80 | 55.6 | 1.69680 |
| 5 | 52.494 | (d5) | | |
| 6 | 75.327 | 1.50 | 55.6 | 1.69680 |
| 7 | 13.051 | 5.40 | | |
| 8 | −24.719 | 1.20 | 55.6 | 1.69680 |
| 9 | 109.615 | 0.20 | | |
| 10 | 29.741 | 3.30 | 25.5 | 1.80458 |
| 11 | −75.999 | 1.20 | 43.3 | 1.84042 |
| 12 | 158.365 | (d12) | | |
| 13 | 45.324 | 3.20 | 64.1 | 1.51680 |
| 14 | −38.885 | 0.10 | | |
| 15 | 21.606 | 6.20 | 69.9 | 1.51860 |
| 16 | −21.375 | 3.00 | 39.6 | 1.80454 |
| 17 | 54.807 | (d17) | | |
| 18 | 375.899 | 4.50 | 60.1 | 1.62041 |
| 19 | −23.234 | 0.10 | | |
| 20 | 74.386 | 3.30 | 50.8 | 1.65844 |
| 21 | −56.208 | 2.40 | | |
| 22 | −20.007 | 1.20 | 39.6 | 1.80454 |
| 23 | −829.763 | (Bf) | | |
| f | 35.9981 | 59.9964 | 103.0187 | |
| d5 | 1.5844 | 12.4303 | 23.1397 | |
| d12 | 14.6271 | 8.5396 | 2.5286 | |
| d17 | 9.1990 | 7.8301 | 7.4701 | |
| Bf | 41.3233 | 51.1822 | 59.7216 | |

Sixth surface (aspherical surface)
R = 75.327
$C_4 = -0.2279E-05$, $C_6 = -0.8209E-07$
$C_8 = 0.6910E-09$, $C_{10} = -0.2805E-11$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represents the aspherical surface coefficient with $10^{-n}$ as E-n.

11. A zoom lens according to claim 1, which is constructed in accordance with the following data:

| | r | d | ν | n |
|---|---|---|---|---|
| 1 | 118.343 | 1.50 | 23.0 | 1.86074 |
| 2 | 58.652 | 7.30 | 69.9 | 1.51860 |
| 3 | −122.366 | 0.10 | | |
| 4 | 33.396 | 3.80 | 55.6 | 1.69680 |
| 5 | 52.877 | (d5) | | |
| 6 | 73.858 | 1.50 | 53.3 | 1.69350 |

-continued

| | | | | |
|---|---|---|---|---|
| 7 | 12.899 | 5.10 | | |
| 8 | −23.692 | 1.20 | 55.6 | 1.69680 |
| 9 | 120.425 | 0.20 | | |
| 10 | 29.938 | 3.30 | 25.5 | 1.80458 |
| 11 | −61.989 | 1.20 | 43.3 | 1.84042 |
| 12 | 189.256 | (d12) | | |
| 13 | 47.033 | 3.50 | 64.1 | 1.51680 |
| 14 | −38.870 | 0.10 | | |
| 15 | 20.876 | 6.20 | 56.4 | 1.50137 |
| 16 | −21.570 | 3.00 | 33.9 | 1.80384 |
| 17 | 59.932 | (d17) | | |
| 18 | 356.270 | 4.50 | 54.0 | 1.61720 |
| 19 | −22.902 | 0.10 | | |
| 20 | 78.513 | 3.30 | 58.5 | 1.65160 |
| 21 | −56.099 | 2.40 | | |
| 22 | −19.489 | 1.20 | 40.9 | 1.79631 |
| 23 | −387.670 | (Bf) | | |

| | | | |
|---|---|---|---|
| f | 36.0332 | 60.0354 | 103.0147 |
| d5 | 1.7714 | 12.6172 | 23.3267 |
| d12 | 14.4840 | 8.3965 | 2.3855 |
| d17 | 9.1067 | 7.7378 | 7.3778 |
| Bf | 41.4136 | 51.2588 | 59.7464 |

Sixth surface (aspherical surface)
R = 73.858
$C_4 = -0.2036\text{E}-05$, $C_6 = -0.8148\text{E}-07$
$C_8 = 0.6559\text{E}-09$, $C_{10} = -0.2684\text{E}-11$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represent the aspherical surface coefficient with $10^{-n}$ as E-n.

12. A zoom lens according to claim 1, which is constructed in accordance with the following data:

| | r | d | ν | n |
|---|---|---|---|---|
| 1 | 120.145 | 1.50 | 25.5 | 1.80458 |
| 2 | 52.949 | 7.90 | 69.9 | 1.51860 |
| 3 | −110.566 | 0.10 | | |
| 4 | 31.984 | 3.80 | 55.6 | 1.69680 |
| 5 | 48.957 | (d5) | | |
| 6 | 49.087 | 1.80 | 46.5 | 1.80411 |
| 7 | 13.558 | 5.40 | | |
| 8 | −26.793 | 1.20 | 46.5 | 1.80411 |
| 9 | 114.932 | 0.20 | | |
| 10 | 30.047 | 3.30 | 23.0 | 1.86074 |
| 11 | −114.188 | 1.20 | 49.4 | 1.77279 |
| 12 | 110.881 | (d12) | | |
| 13 | 52.088 | 3.20 | 60.3 | 1.51835 |
| 14 | −42.661 | 0.10 | | |
| 15 | 19.984 | 6.20 | 64.1 | 1.51680 |
| 16 | −25.974 | 3.00 | 33.9 | 1.80384 |
| 17 | 49.762 | (d17) | | |
| 18 | 100.778 | 3.50 | 37.9 | 1.72342 |
| 19 | −31.102 | 0.10 | | |
| 20 | 146.905 | 3.00 | 33.9 | 1.80384 |
| 21 | −60.597 | 2.50 | | |
| 22 | −20.403 | 1.20 | 25.5 | 1.80458 |
| 23 | −3247.710 | (Bf) | | |

| | | | |
|---|---|---|---|
| f | 35.9988 | 59.9982 | 102.9942 |
| d5 | 1.1646 | 11.9945 | 22.1327 |
| d12 | 14.8379 | 8.6437 | 2.3302 |
| d17 | 10.3479 | 9.6336 | 9.4800 |
| Bf | 40.5897 | 49.8335 | 58.4844 |

Sixth surface (aspherical surface)
R = 49.087
$C_4 = -0.6974\text{E}-05$, $C_6 = -0.4332\text{E}-07$
$C_8 = 0.2560\text{E}-09$, $C_{10} = -0.1310\text{E}-11$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represents the aspherical surface coefficient with $10^{-n}$ as E-n.

13. A zoom lens according to claim 1, which is constructed in accordance with the following data:

| | r | d | ν | n |
|---|---|---|---|---|
| 1 | 99.956 | 1.50 | 23.0 | 1.86074 |
| 2 | 54.213 | .50 | | |
| 3 | 53.257 | 7.30 | 69.9 | 1.51860 |
| 4 | −134.947 | 0.10 | | |
| 5 | 33.368 | 3.80 | 55.6 | 1.69680 |
| 6 | 50.215 | (d5) | | |
| 7 | 74.980 | 1.50 | 55.6 | 1.69680 |
| 8 | 12.950 | 5.10 | | |
| 9 | −24.122 | 1.20 | 55.6 | 1.69680 |
| 10 | 116.302 | 0.20 | | |
| 11 | 29.623 | 3.30 | 25.5 | 1.80458 |
| 12 | −79.429 | 1.20 | 43.3 | 1.84042 |
| 13 | 162.147 | (d12) | | |
| 14 | 42.225 | 3.50 | 64.1 | 1.51680 |
| 15 | −42.225 | 0.10 | | |
| 16 | 21.790 | 6.20 | 56.4 | 1.50137 |
| 17 | −21.790 | 3.00 | 33.9 | 1.80384 |
| 18 | 66.364 | (d18) | | |
| 19 | 1646.746 | 4.50 | 54.0 | 1.61720 |
| 20 | −23.205 | 0.10 | | |
| 21 | 61.237 | 3.30 | 58.5 | 1.65160 |
| 22 | −61.237 | 2.40 | | |
| 23 | −20.217 | 1.20 | 40.9 | 1.79631 |
| 24 | −1314.012 | (Bf) | | |

| | | | |
|---|---|---|---|
| f | 36.0362 | 60.1034 | 103.0141 |
| d6 | 1.7713 | 12.6171 | 23.3266 |
| d13 | 14.4840 | 8.3965 | 2.3855 |
| d18 | 9.1067 | 7.7378 | 7.3778 |
| Bf | 41.2895 | 51.0141 | 59.0757 |

-continued

Seventh surface (aspherical surface)
R = 74.980
$C_4 = -0.1862E{-}05$, $C_6 = -0.8809E{-}07$
$C_8 = 0.7091E{-}09$, $C_{10} = -0.2741E{-}11$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represents the aspherical surface coefficient with $10^{-n}$ as E-n.

14. A zoom lens comprising, in succession from the object side, a first lens group having a positive refractive power, a second lens group having a negative refractive power, a third lens group having a positive refractive power, and a fourth lens group having a positive refractive power,
  said zoom lens being designed such that during the magnification change from the wide angle and to the telephoto end, the air space between said first lens group and said second lens group is enlarged, the air space between said second lens group and said third lens group is reduced and further, the air space between said third lens group and said fourth lens group is varied,
  said second lens group comprising, in succession from the object side, a negative meniscus lens having its convex surface facing the object side, a cemented negative lens consisting of a positive lens and a negative lens cemented together, and a positive meniscus lens having its convex surface facing the object side,
  said second lens group being designed to satisfy the following conditions:

$-0.6 < f2/fw < -0.4$ $-1.1 < f22/fw < -0.5$ $\nu_{22n} - \nu_{22p} > 19$ where
$f_w$ : the focal length of the zoom lens at the wide angle end
$f_2$ : the focal length of the second lens group
$f_{22}$ : the focal length of the cemented negative lens in the second lens group
$\nu_{22n}$ : the Abbe number of the negative lens in the cemented negative lens in the second lens group
$\nu_{22p}$ : the Abbe number of the positive lens in the cemented negative lens in the second lens group.

15. A zoom lens according to claim 14, wherein said second lens group is designed to further satisfy the following condition in order to make the zoom lens more compact:

$-0.5 < f2/fw < -0.4$.

16. A zoom lens according to claim 14, wherein said cemented negative lens in said second lens group comprises, in succession from the object side, a positive meniscus lens having its convex surface facing the image side, and a negative lens cemented to said positive meniscus lens and having its surface of sharper curvature facing the object side, and is designed to satisfy the following condition:

$-0.65 < rs1/fw < -0.3$ where $r_{S1}$ is the radius of curvature of the cemented surface of said cemented negative lens in said second lens group.

17. A zoom lens according to claim 14, wherein said cemented negative lens in said second lens group comprises, in succession from the object side, a biconcave negative lens, and a positive lens cemented to said negative lens and having its surface of sharper curvature facing the object side, and is designed to satisfy the following condition:

$0.79 < rs1/fw < 2$ where $r_{S1}$ is the radius of curvature of the cemented surface of said cemented negative lens in said second lens group.

18. A zoom lens according to claim 14, wherein said third lens group and said fourth lens group are designed to satisfy the following conditions:

$-3 < f3/f2 < -2$ $-4.2 < f4/f2 < -2.9$ where $f_3$ is the focal length of said third lens group, and $f_4$ is the focal length of said fourth lens group.

19. A zoom lens according to claim 14, wherein said negative single lens and said cemented negative lens in said second lens group are designed to satisfy the following condition:

$1 < f22/f21 < 1.6$.

where $f_{21}$ is the focal length of said negative single lens in said second lens group, and $f_{22}$ is the focal length of said cemented negative lens in said second lens group.

20. A zoom lens according to claim 14, wherein one of the surfaces of the plurality of lenses constituting said second lens group is formed into an aspherical surface whose negative refractive power progressively becomes stronger from the optic axis toward the margin.

21. A zoom lens according to claim 20, wherein one of said negative meniscus lens and said cemented negative lens in said second lens group has its object side surface constructed of an aspherical surface which satisfies the following condition:

$X(l/3) - X_0(l/3) < 0$ where $X(y) = X_0(y) + C_4 \cdot y^4 + C_6 \cdot y^6 + C_8 \cdot y^8 + C_{10} \cdot y^{10}$ -continued $$X_0(y) = \frac{y^2}{R(1 + \sqrt{1 - y^2/R^2})}$$

l : maximum image height
y : the height from the optic axis
R : the radius of curvature of the paraxial reference spherical surface
$C_i$ : aspherical surface coefficient (i=4, 6, 8, 10)
X(y) : the distance along the direction of the optic axis from the tangential plane at the vertex of the aspherical surface to the position on the aspherical surface at the height y
$X_O(y)$ : the distance along the direction of the optic axis from the tangential plane at the vertex of the aspherical surface to the position on the paraxial reference spherical surface of the aspherical surface at the height y.

22. A zoom lens according to claim 14, wherein said third lens group comprises in succession from the object side, a biconvex positive single lens and a cemented lens consisting of a biconvex positive lens and a biconcave negative lens cemented together, and satisfies the following conditions:

$0.26 < n32n - n32p$ $-1.1 < rs2/f3 < -0.46$ where
$n_{32p}$ : the refractive index of the biconvex positive lens in the cemented lens in the third lens group for d-line (587.6 nm)
$n_{32n}$ : the refractive index of the biconcave negative lens in the cemented lens in the third lens group for d-line (587.6 nm)
$r_{S2}$ : the radius of curvature of the cemented surface of the cemented lens in the third lens group.

23. A zoom lens according to claim 14, wherein said fourth lens group comprises, in succession from the object side, a positive lens, a biconvex positive lens and a negative lens having its surface of sharper curvature facing the object side.

24. A zoom lens according to claim 14, which is constructed in accordance with the following data:

|   | r | d | Abbe | n |
|---|---|---|------|---|
| 1 | 118.343 | 1.50 | 23.0 | 1.86074 |
| 2 | 58.652 | 7.30 | 69.9 | 1.51860 |
| 3 | −122.366 | 0.10 | | |
| 4 | 33.634 | 3.80 | 51.1 | 1.73350 |
| 5 | 51.679 | 1.55 | | |
| 6 | 51.492 | 1.50 | 52.3 | 1.74810 |
| 7 | 13.662 | 5.10 | | |
| 8 | −24.720 | 2.80 | 25.5 | 1.80458 |
| 9 | −14.348 | 1.20 | 49.4 | 1.77279 |
| 10 | 418.286 | 0.20 | | |
| 11 | 30.648 | 1.90 | 25.5 | 1.80458 |
| 12 | 64.282 | 14.33 | | |
| 13 | 48.210 | 3.50 | 64.1 | 1.51680 |
| 14 | −37.593 | 0.10 | | |
| 15 | 21.267 | 6.20 | 56.4 | 1.50137 |
| 16 | −21.285 | 3.00 | 33.9 | 1.80384 |
| 17 | 62.757 | 9.63 | | |
| 18 | 340.249 | 4.50 | 53.9 | 1.71300 |
| 19 | −23.909 | 0.10 | | |
| 20 | 91.716 | 3.30 | 58.5 | 1.65160 |
| 21 | −72.874 | 2.40 | | |
| 22 | −19.349 | 1.20 | 40.9 | 1.79631 |
| 23 | −285.532 | 41.20 | | |
| f | 36.0328 | 60.0346 | | 103.0120 |
| d5 | 1.5511 | 12.3969 | | 23.1064 |
| d12 | 14.3330 | 8.2455 | | 2.2345 |
| d17 | 9.6254 | 8.2565 | | 7.8965 |
| Bf | 41.2000 | 51.0445 | | 59.5303 |

Sixth surface (aspherical surface)
$C_4 = -0.3616\text{E}-05$, $C_6 = -0.8343\text{E}-07$
$C_8 = 0.6907\text{E}-09$, $C_{10} = -0.2864\text{E}-11$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represents the aspherical surface coefficient with $10^{-n}$ as E-n.

25. A zoom lens according to claim 14, which is constructed in accordance with the following data:

|   | r | d | Abbe | n |
|---|---|---|------|---|
| 1 | 118.343 | 1.50 | 23.0 | 1.86074 |
| 2 | 58.652 | 7.30 | 69.9 | 1.51860 |
| 3 | −122.366 | 0.10 | | |
| 4 | 33.396 | 3.80 | 55.6 | 1.69680 |
| 5 | 52.877 | 1.79 | | |
| 6 | 85.328 | 1.50 | 57.5 | 1.67025 |
| 7 | 13.626 | 5.10 | | |
| 8 | −24.265 | 2.40 | 25.5 | 1.80458 |
| 9 | −13.985 | 1.20 | 47.5 | 1.78797 |
| 10 | −1196.567 | 0.20 | | |
| 11 | 31.517 | 2.30 | 25.5 | 1.80458 |
| 12 | 70.772 | 14.26 | | |
| 13 | 47.033 | 3.50 | 64.1 | 1.51680 |
| 14 | −38.870 | 0.10 | | |
| 15 | 20.876 | 6.20 | 56.4 | 1.50137 |
| 16 | −21.570 | 3.00 | 33.9 | 1.80384 |
| 17 | 59.933 | 9.11 | | |
| 18 | 356.270 | 4.50 | 54.0 | 1.61720 |
| 19 | −22.902 | 0.10 | | |
| 20 | 78.513 | 3.30 | 58.5 | 1.65160 |
| 21 | −56.099 | 2.40 | | |
| 22 | −19.489 | 1.20 | 40.9 | 1.79631 |
| 23 | −387.656 | 41.41 | | |
| f | 36.0329 | 60.0347 | | 103.0125 |
| d5 | 1.7902 | 12.6360 | | 23.3455 |
| d12 | 14.2575 | 8.1700 | | 2.1590 |
| d17 | 9.1067 | 7.7378 | | 7.3778 |
| Bf | 41.4128 | 51.2574 | | 59.7436 |

Eighth surface (aspherical surface)
$C_4 = -0.3808\text{E}-05$, $C_6 = -0.1145\text{E}-06$
$C_8 = 0.1538\text{E}-08$, $C_{10} = -0.1336\text{E}-10$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represents the aspherical surface coefficient with $10^{-n}$ as E-n.

26. A zoom lens according to claim 14, which is constructed in accordance with the following data:

|  | r | d | Abbe | n |
|---|---|---|---|---|
| 1 | 118.343 | 1.50 | 23.0 | 1.86074 |
| 2 | 58.652 | 7.30 | 69.9 | 1.51860 |
| 3 | −122.366 | 0.10 | | |
| 4 | 33.396 | 3.80 | 55.6 | 1.69680 |
| 5 | 52.877 | 1.82 | | |
| 6 | 61.938 | 1.50 | 55.6 | 1.69680 |
| 7 | 13.009 | 5.10 | | |
| 8 | −24.778 | 2.40 | 25.5 | 1.80458 |
| 9 | −16.249 | 1.20 | 52.3 | 1.74810 |
| 10 | 172.526 | 0.20 | | |
| 11 | 29.980 | 2.30 | 25.5 | 1.80458 |
| 12 | 80.762 | 14.47 | | |
| 13 | 42.555 | 3.50 | 64.1 | 1.51680 |
| 14 | −38.088 | 0.10 | | |
| 15 | 21.789 | 6.20 | 56.4 | 1.50137 |
| 16 | −21.658 | 3.00 | 33.9 | 1.80384 |
| 17 | 56.880 | 8.80 | | |
| 18 | 293.077 | 4.50 | 54.0 | 1.61720 |
| 19 | −22.932 | 0.10 | | |
| 20 | 80.751 | 3.30 | 58.5 | 1.65160 |
| 21 | −61.128 | 2.40 | | |
| 22 | −19.591 | 1.20 | 40.9 | 1.79631 |
| 23 | −274.524 | 41.49 | | |
| f | 36.0329 | 59.9997 | | 102.9999 |
| d5 | 1.8185 | 14.9331 | | 25.9585 |
| d12 | 14.4699 | 8.8867 | | 2.4707 |
| d17 | 8.7976 | 7.5612 | | 8.2439 |
| Bf | 41.4869 | 48.3064 | | 54.0396 |

Sixth surface (aspherical surface)
$C_4 = -0.4308E-05$, $C_6 = -0.9156E-07$
$C_8 = 0.7541E-09$, $C_{10} = -0.3154E-11$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represents the aspherical surface coefficient with $10^{-n}$ as E-n.

27. A zoom lens according to claim 14, which is constructed in accordance with the following data:

|  | r | d | Abbe | n |
|---|---|---|---|---|
| 1 | 113.125 | 1.50 | 23.0 | 1.86074 |
| 2 | 57.134 | 7.30 | 69.9 | 1.51860 |
| 3 | −126.031 | 0.10 | | |
| 4 | 33.040 | 3.80 | 58.5 | 1.65160 |
| 5 | 54.293 | 1.33 | | |
| 6 | 52.180 | 1.50 | 57.5 | 1.67025 |
| 7 | 12.713 | 5.10 | | |
| 8 | −24.918 | 1.10 | 52.3 | 1.74810 |
| 9 | 32.898 | 2.30 | 23.0 | 1.86074 |
| 10 | 167.263 | 0.10 | | |
| 11 | 27.406 | 1.90 | 25.5 | 1.80458 |
| 12 | 52.450 | 15.02 | | |
| 13 | 51.155 | 3.50 | 69.9 | 1.51860 |
| 14 | −38.045 | 0.10 | | |
| 15 | 20.881 | 6.20 | 56.4 | 1.50137 |
| 16 | −21.302 | 3.00 | 33.9 | 1.80384 |
| 17 | 64.699 | 8.89 | | |
| 18 | −7924.511 | 4.50 | 50.8 | 1.65844 |
| 19 | −23.176 | 0.10 | | |
| 20 | 78.513 | 3.30 | 57.0 | 1.62280 |
| 21 | −51.820 | 2.40 | | |
| 22 | −19.489 | 1.20 | 40.9 | 1.79631 |
| 23 | −325.859 | 41.74 | | |
| f | 36.0327 | 60.0344 | | 103.0112 |
| d5 | 1.3272 | 12.1730 | | 22.8825 |
| d12 | 15.0199 | 8.9324 | | 2.9214 |
| d17 | 8.8935 | 7.5246 | | 7.1646 |
| Bf | 41.7425 | 51.5867 | | 60.0720 |

Sixth surface (aspherical surface)
$C_4 = -0.3724E-05$, $C_6 = -0.6826E-07$
$C_8 = 0.4312E-09$, $C_{10} = -0.1677E-11$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represents the aspherical surface coefficient with $10^{-n}$ as E-n.

28. A zoom lens according to claim 14, which is constructed in accordance with the following data:

|   | r | d | Abbe | n |
|---|---|---|---|---|
| 1 | 117.146 | 1.50 | 23.0 | 1.86074 |
| 2 | 59.914 | 7.30 | 69.9 | 1.51860 |
| 3 | −129.995 | 0.10 | | |
| 4 | 34.324 | 3.80 | 58.5 | 1.65160 |
| 5 | 58.817 | 1.42 | | |
| 6 | 48.701 | 1.50 | 57.5 | 1.67025 |
| 7 | 12.637 | 5.10 | | |
| 8 | −24.441 | 1.10 | 52.3 | 1.74810 |
| 9 | 34.076 | 2.30 | 23.0 | 1.86074 |
| 10 | 155.098 | 0.10 | | |
| 11 | 27.849 | 1.90 | 25.5 | 1.80458 |
| 12 | 55.884 | 14.95 | | |
| 13 | 40.866 | 3.50 | 69.9 | 1.51860 |
| 14 | −42.729 | 0.10 | | |
| 15 | 22.791 | 6.20 | 56.4 | 1.50137 |
| 16 | −20.659 | 3.00 | 33.9 | 1.80384 |
| 17 | 76.686 | 8.81 | | |
| 18 | −10952.961 | 4.50 | 50.8 | 1.65844 |
| 19 | −23.332 | 0.10 | | |
| 20 | 79.500 | 3.30 | 57.0 | 1.62280 |
| 21 | −51.786 | 2.40 | | |
| 22 | −19.555 | 1.20 | 40.9 | 1.79631 |
| 23 | −297.866 | 41.82 | | |
| f | 36.0325 | 60.0339 | | 103.0097 |
| d5 | 1.4211 | 12.2669 | | 22.9764 |
| d12 | 14.9469 | 8.8594 | | 2.8484 |
| d17 | 8.8131 | 7.4442 | | 7.0842 |
| Bf | 41.8181 | 51.6619 | | 60.1462 |

Sixth surface (aspherical surface)

$C_4 = -0.3743\text{E-}05$, $C_6 = -0.6955\text{E-}07$
$C_8 = 0.5633\text{E-}09$, $C_{10} = -0.2637\text{E-}11$ wherein the numbers at the left end represent the order from the object side, r represents the radius of curvature of each lens surface, d represents the thickness of each lens and the spacing between the lens surfaces, n represents the refractive index for d-line, and f represents focal length of the zoom lens and wherein, the shape of the aspherical surface provided on the object side surface of the positive meniscus lens L 21 located most adjacent to the object side of the second lens group G2 is shown by the aspherical surface equation given below.

$$X(y) = \frac{y^2}{R(1 + \sqrt{1 - y^2/R^2})} + C_4 y^4 + C_6 y^6 + C_8 y^8 + C_{10} y^{10}$$

where X(y) represents the distance along the direction of the optic axis from the tangential plane at the vertex of the aspherical surface to the position on the aspherical surface at a height y, R represents the paraxial radius of curvature, and Cn represents the aspherical surface coefficient with $10^{-n}$ as E-n.

* * * * *